(12) United States Patent
Kawakami et al.

(10) Patent No.: US 8,777,788 B2
(45) Date of Patent: Jul. 15, 2014

(54) BICYCLE COMPONENT POSITIONING DEVICE

(75) Inventors: Tatsuya Kawakami, Osaka (JP); Atsushi Iizuka, Osaka (JP)

(73) Assignee: Shimano Inc., Osaka (JP)

( * ) Notice: Subject to any disclaimer, the term of this patent is extended or adjusted under 35 U.S.C. 154(b) by 1195 days.

(21) Appl. No.: 11/672,673

(22) Filed: Feb. 8, 2007

(65) Prior Publication Data
US 2008/0190234 A1    Aug. 14, 2008

(51) Int. Cl.
*B62M 9/12*    (2006.01)
*B62M 9/1344*    (2010.01)

(52) U.S. Cl.
USPC ............ 474/80; 474/82; 74/473.14; 74/489; 74/502.2; 74/534

(58) Field of Classification Search
USPC ......... 74/473.13, 489, 502.2, 473.14, 473.15, 74/533, 534; 474/70, 71, 78, 80, 82
IPC ........................................................ B62M 9/12
See application file for complete search history.

(56) References Cited

U.S. PATENT DOCUMENTS

| | | | | |
|---|---|---|---|---|
| 2,431,513 A | * | 11/1947 | Schwinn | 474/80 |
| 3,481,217 A | * | 12/1969 | Maeda Tetsuo | 74/489 |
| 3,890,847 A | * | 6/1975 | Dian | 474/80 |
| 4,106,356 A | | 8/1978 | Nagano et al. | |
| 4,132,119 A | * | 1/1979 | Nagano et al. | 474/82 |
| 4,155,270 A | * | 5/1979 | Juy | 74/473.13 |
| 4,185,510 A | * | 1/1980 | Juy | 474/82 |
| 4,232,564 A | * | 11/1980 | Yamasaki | 74/473.13 |
| 5,012,692 A | | 5/1991 | Nagano | |
| 5,044,213 A | | 9/1991 | Nagano | |
| 5,095,768 A | | 3/1992 | Nagano | |
| 5,102,372 A | * | 4/1992 | Patterson et al. | 474/80 |
| 5,222,412 A | | 6/1993 | Nagano | |
| 5,588,331 A | | 12/1996 | Huang et al. | |
| 5,666,859 A | | 9/1997 | Arbeiter et al. | |
| 5,730,030 A | | 3/1998 | Masui | |

(Continued)

FOREIGN PATENT DOCUMENTS

| | | |
|---|---|---|
| DE | 196 13 575 A | 10/1997 |
| EP | 1 040 995 A2 | 10/2000 |

(Continued)

OTHER PUBLICATIONS

European Search Report of corresponding EP Application No. 07 020 887.1 dated Aug. 2, 2010.

*Primary Examiner* — David D Le
*Assistant Examiner* — Terry Chau
(74) *Attorney, Agent, or Firm* — Global IP Counselors

(57) ABSTRACT

A bicycle component positioning device includes a fixed member, an operating member and a positioning mechanism. The operating member has an input portion and an output portion. The positioning mechanism is operatively disposed between the operating member and the fixed member. The positioning mechanism includes a positioning member that is movable between a first position in which the positioning member is engaged with the fixed member and a second position in which the positioning member is disengaged from the fixed member. The positioning member is held in engagement with the fixed member in the first position by the input portion when the input portion is in an operating position. The positioning member is movable from the first position to the second position upon movement of the input portion from at least one of the operating positions.

14 Claims, 18 Drawing Sheets

(56) References Cited

U.S. PATENT DOCUMENTS

| | | |
|---|---|---|
| 5,755,139 A | 5/1998 | Kojima |
| 5,799,542 A | 9/1998 | Yamane |
| 5,921,139 A | 7/1999 | Yamane |
| 6,021,688 A * | 2/2000 | Chang .................. 74/502.2 |
| 6,066,057 A | 5/2000 | Nakamura et al. |
| 6,135,906 A | 10/2000 | Ichida |
| 6,145,407 A | 11/2000 | Rottmann |
| 6,209,413 B1 * | 4/2001 | Chang .................. 74/502.2 |
| 6,467,368 B1 | 10/2002 | Feng et al. |
| 6,553,860 B2 | 4/2003 | Blaschke |
| 6,644,143 B2 * | 11/2003 | Feng et al. .......... 74/502.2 |
| 6,810,764 B2 | 11/2004 | Chen |
| 6,862,948 B1 | 3/2005 | Calendrille, Jr. |
| 6,877,393 B2 | 4/2005 | Takachi |
| 6,993,995 B2 | 2/2006 | Fujii |
| 2002/0112559 A1 | 8/2002 | Liu |
| 2002/0144566 A1 | 10/2002 | Liu et al. |
| 2004/0005947 A1 | 1/2004 | Shahana et al. |
| 2004/0069089 A1 | 4/2004 | Chen |
| 2004/0261566 A1 * | 12/2004 | Feng .................. 74/501.6 |
| 2005/0034554 A1 | 2/2005 | Hou |
| 2005/0193856 A1 | 9/2005 | Dal Pra et al. |
| 2006/0053941 A1 | 3/2006 | Dal Pra et al. |
| 2006/0096404 A1 | 5/2006 | Wessel et al. |
| 2006/0130602 A1 | 6/2006 | Kawakami |
| 2006/0207375 A1 | 9/2006 | Jordan et al. |
| 2006/0260427 A1 | 11/2006 | Tsumiyama |
| 2007/0017316 A1 | 1/2007 | Tsumiyama |

FOREIGN PATENT DOCUMENTS

| | | |
|---|---|---|
| EP | 1 095 847 A1 | 5/2001 |
| FR | 2 342 887 | 9/1977 |
| GB | 602 711 | 6/1948 |
| GB | 2 099 961 A | 12/1982 |
| JP | 48-37835 | 6/1973 |
| JP | 51-18046 | 2/1976 |
| JP | 51-28934 | 3/1976 |
| JP | 51-43541 | 4/1976 |
| JP | 51-50141 | 5/1976 |
| JP | 52-15033 | 2/1977 |
| JP | 53-98644 | 8/1978 |
| JP | 54-15241 | 2/1979 |
| JP | 55-25693 | 2/1980 |
| JP | 61-103283 U | 7/1986 |
| JP | 96/028338 A1 | 9/1996 |
| JP | 11-78577 A | 3/1999 |

* cited by examiner

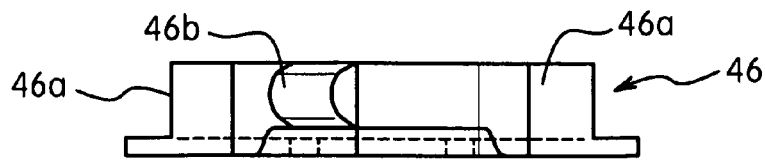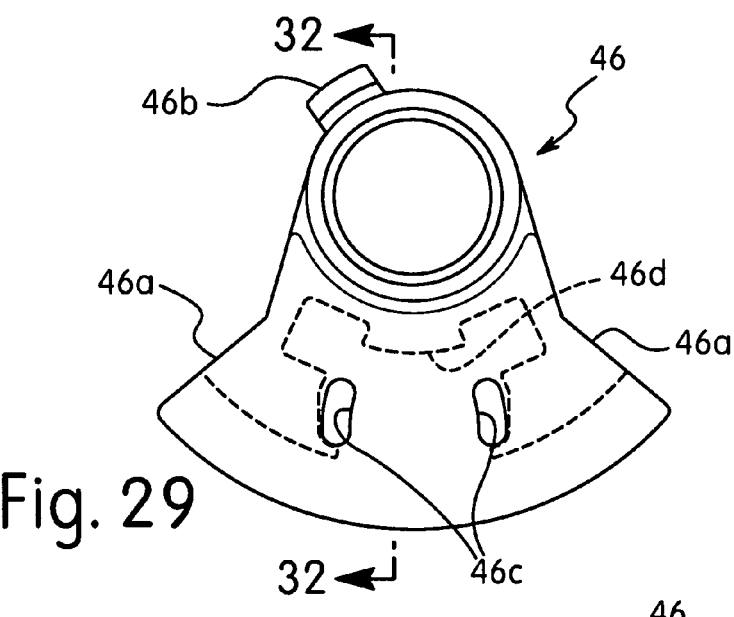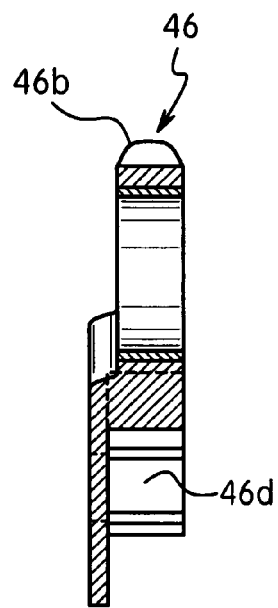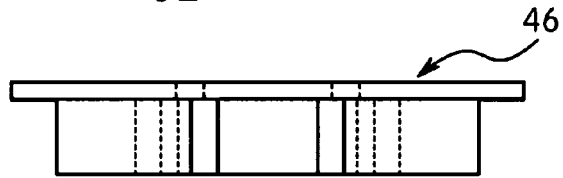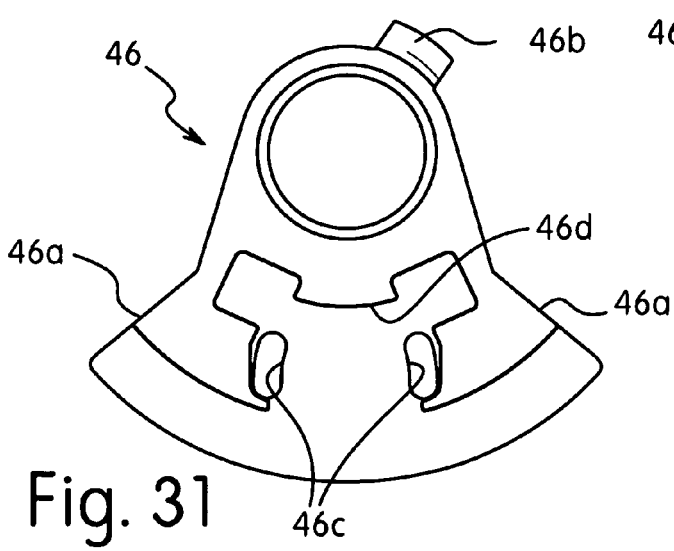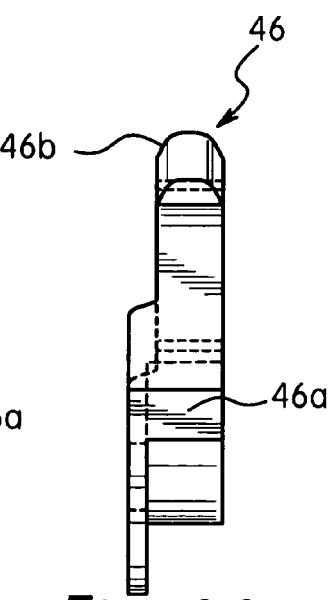

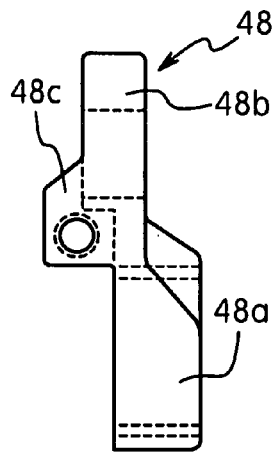 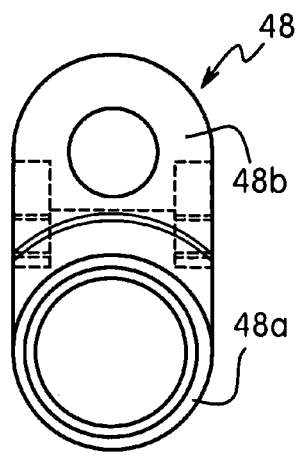 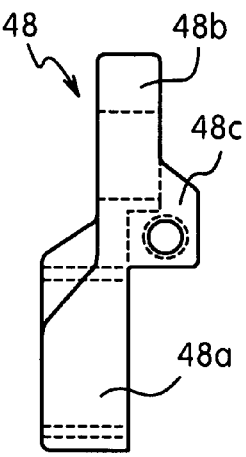
Fig. 34  Fig. 35  Fig. 36
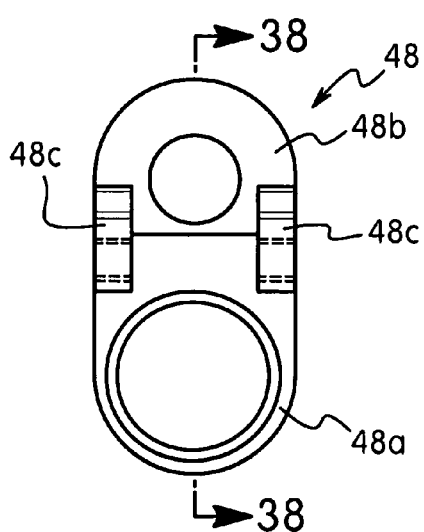 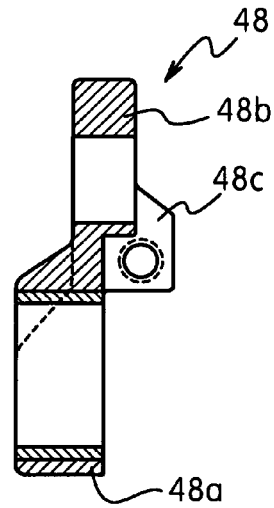
Fig. 37  Fig. 38
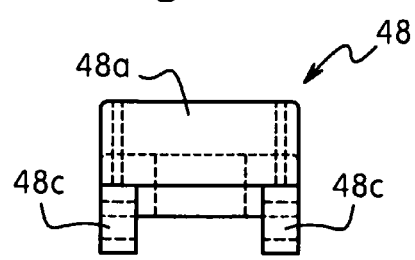 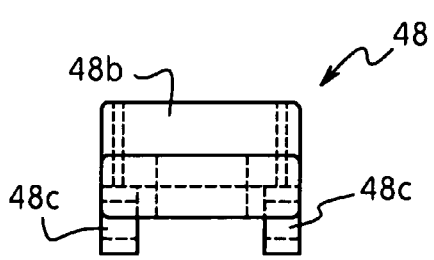
Fig. 39  Fig. 40

BICYCLE COMPONENT POSITIONING DEVICE

BACKGROUND OF THE INVENTION

1. Field of the Invention

This invention generally relates to a bicycle component positioning device. More specifically, the present invention relates to a bicycle component positioning device for a bicycle component such as a derailleur or shifter, which has the same relatively easy action when moved in two opposite directions, yet is reliably retained.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle such as derailleurs and shifters.

A bicycle derailleur basically includes a base, a chain guide and a linkage coupled between the base and the chain guide to move the chain guide between various shift positions. The base is fixed to the bicycle frame. A spring is arranged to bias the chain guide in one lateral direction relative to the base. A control cable is used to move the chain guide against the biasing force of the spring when pulled, and to allow the bias force of the spring to move the chain guide in an opposite direction when the cable is released. A shifter is attached to the cable to selectively pull/release the cable to move the chain guide laterally back and forth respectively. With these conventional derailleurs, shifting is not always as smooth and reliable as desired by some riders. Moreover, the control cable is always held in tension by the spring, which leads to continued cable stretching. Continued cable stretching leads to frequent adjustment of the derailleur and/or shifter or minor misalignment of the derailleur. Furthermore, conventional derailleurs can be relatively complicated and expensive to manufacture, assemble, to mount to the bicycle and/or adjust.

The shifter for controlling conventional derailleurs typically utilize one or more levers coupled to a winding member to selectively pull/release the cable. The winding member is retained in various shift positions by a retaining structure, friction or the like. Optionally, some shifters further include an indexing mechanism with a plurality of positions corresponding to the number of shift positions. In any case, a sufficient retaining force must be applied to the winding member to prevent undesired movement of the chain guide of the derailleur due to the biasing force of the derailleur spring. Thus, a relatively strong retaining force must be provided, which can be relatively difficult to overcome when moving the lever(s). Additionally, when the shifting device is actuated to wind the cable, an even stronger force is often required than during an unwinding operating due to the derailleur biasing member. In either case, the shifting action(s) may feel awkward to some individuals. Also, with these conventional shifters, shifting is not always as smooth and reliable as desired by some riders. Moreover, conventional shifters can be relatively complicated and expensive to manufacture, assemble, to mount to the bicycle and/or adjust.

In view of the above, it will be apparent to those skilled in the art from this disclosure that there exists a need for an improved bicycle component positioning device. This invention addresses this need in the art as well as other needs, which will become apparent to those skilled in the art from this disclosure.

SUMMARY OF THE INVENTION

One object of the present invention is to provide a bicycle component positioning device, which moves smoothly and reliably, yet is reliably retained in different positions.

Another object of the present invention is to provide a bicycle component positioning device, which has a similar relatively light action when moved in opposite directions.

Another object of the present invention is to provide a bicycle component positioning device, which is relatively simple and inexpensive to manufacture and/or assemble.

The foregoing objects can basically be attained by providing a bicycle component positioning device, which comprises a fixed member, an operating member and a positioning mechanism. The operating member is movably coupled to the fixed member to move between at least two operating positions. The operating member has an input portion and an output portion. The positioning mechanism is operatively disposed between the operating member and the fixed member. The positioning mechanism includes a positioning member that is movable between a first position in which the positioning member is engaged with the fixed member and a second position in which the positioning member is disengaged from the fixed member. The positioning member is held in engagement with the fixed member in the first position by the input portion when the input portion is in at least one of the operating positions. The positioning member is movable from the first position to the second position upon movement of the input portion from at least one of the operating positions.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 28 is a top, plan view of the holding part of the front derailleur positioning device of the front derailleur illustrated in FIGS. 2-8;

FIG. 29 is a (first) end elevational view of the holding part illustrated in FIG. 28;

FIG. 30 is bottom plan view of the holding part illustrated in FIGS. 28 and 29;

FIG. 31 is a (second) end elevational view of the holding part illustrated in FIGS. 28-30;

FIG. 32 is a cross-sectional view of the holding part illustrated in FIGS. 28-31, as viewed along section line 32-32 of FIG. 29;

FIG. 33 is a side elevational view of the holding part illustrated in FIGS. 28-32;

FIG. 34 is a (first) side elevational view of the linkage part of the front derailleur positioning device of the front derailleur illustrated in FIGS. 2-8;

FIG. 35 is a (first) end elevational view of the linkage part illustrated in FIG. 34;

FIG. 36 is a (second) opposite side elevational view of the linkage part illustrated in FIGS. 34 and 35;

FIG. 37 is a (second) opposite end elevational view of the linkage part illustrated in FIGS. 34-36;

FIG. 38 is a cross-sectional view of the linkage part illustrated in FIGS. 34-37, as viewed along section line 38-38 of FIG. 37;

FIG. 39 is a bottom, plan view of the linkage part illustrated in FIGS. 34-38;

FIG. 40 is a top, plan view of the linkage part illustrated in FIGS. 34-39;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
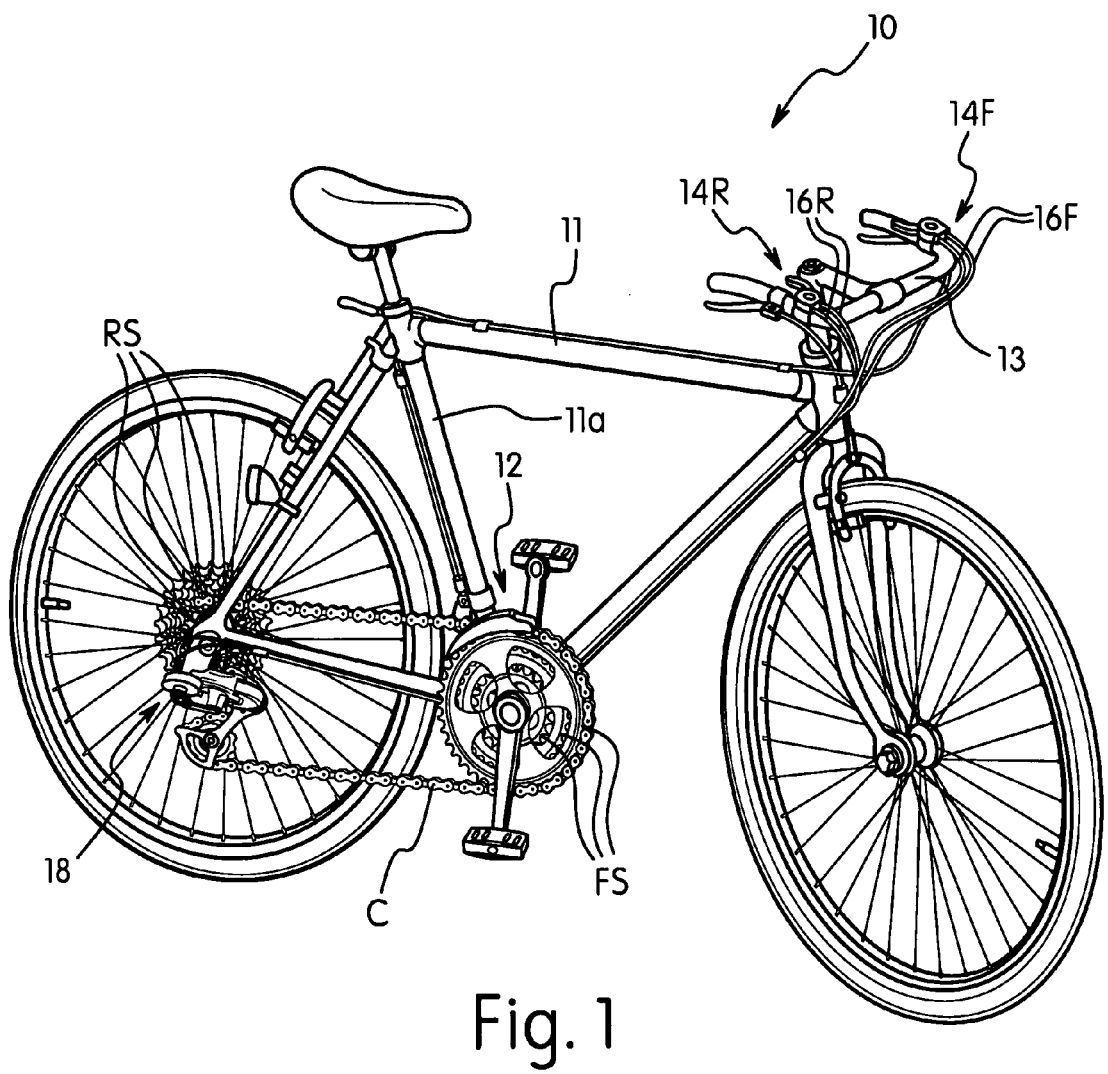
FIG. 1 is a side elevational view of a bicycle equipped with front and rear shifting systems in accordance with the present invention.
Figure 2:
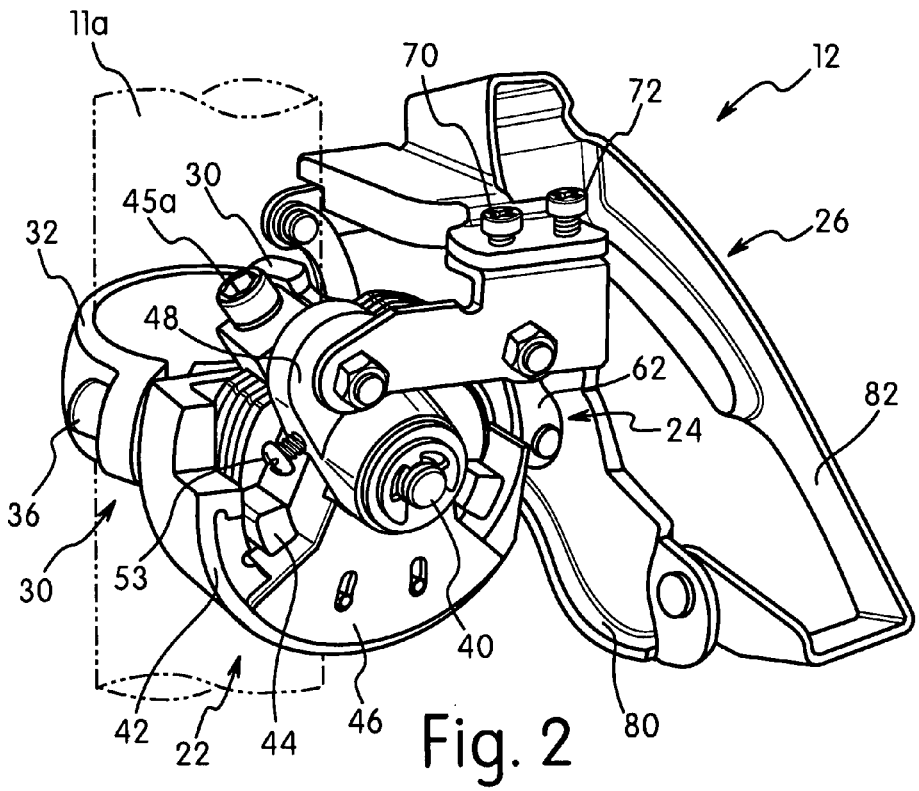
FIG. 2 is an enlarged rear perspective view of the front derailleur of the front shifting system illustrated in FIG. 1, with the chain guide in a retracted position.
Figure 3:
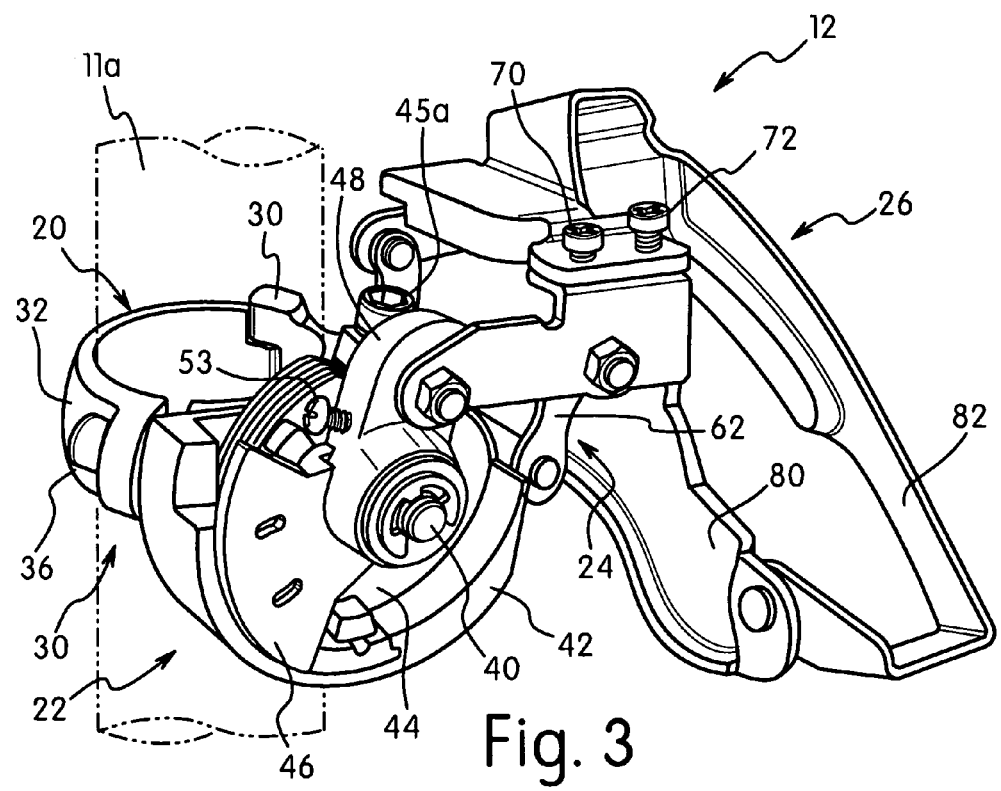
FIG. 3 is an enlarged rear perspective view of the front derailleur of the front shifting system illustrated in FIG. 1, with the chain guide in an extended position.

Referring initially to FIGS. 1-3, a bicycle 10 is illustrated with a front shifting system and a rear shifting system coupled thereto in accordance with the present invention. The front shifting system includes front derailleur 12 and a front shifter 14F operatively coupled to the front derailleur 12 via a pair of front shift control cables 16F to move a chain C between at least two (three illustrated herein) front sprockets or chain rings FS. Similarly, the rear shifting system includes a rear derailleur 18 and a rear shifter 14R operatively coupled to the rear derailleur 18 via a pair of rear shift control cables 16R to move the chain C between a plurality (e.g. seven or eight) of rear sprockets or chain rings RS.

The front and rear derailleurs 12 and 18 are attached to the frame 11 of the bicycle 10, while the front and rear shifters 14F and 14R are attached to the handlebar 13. The handlebar 13 is fixedly coupled to the front fork, which is pivotally attached to the frame 11 to steer the bicycle 10 in a conventional manner. The front and rear shift control cables 16F and 16R are routed along the frame 11 between the front and rear shifters 14F and 14R, and the front and rear derailleurs 12 and 18, respectively. The pair of front shift cables 16F are conventional Bowden-type cables with each having an outer casing 16a and an inner wire 16b. Similarly, the pair of rear shift control cables 16R are conventional Bowden-type cables with each having an outer casing 16a and an inner wire 16b.

The bicycle 10 is conventional, except for the front and rear shifting systems. Accordingly, the bicycle 10 and its various components will not be discussed and/or illustrated in detail herein, except as related to the front and rear shifting systems of the present invention. Moreover, it will be apparent to those skilled in the bicycle art from this disclosure that various modifications can be made to the bicycle 10 and its components without departing from the present invention.

Front Derailleur

Referring initially to FIGS. 1-8, the front derailleur 12 of the front shifting system in accordance with the present invention will now be explained in more detail. The front derailleur 12 includes a fixing body or base member 20, a front derailleur (component) positioning device 22, a support link 24 and a chain guide 26 in accordance with the present invention. The fixing body 20 is fixedly attached to the seat tube 11a of the frame 11. The positioning device 22 is coupled between the fixing body 20 and the chain guide 26 to move the chain guide 26 between and retain the chain guide 26 in at least two shift positions (three illustrated herein) in accordance with the present invention, as best understood from FIGS. 1, 6 and 7. The support link 24 is pivotally coupled to the fixing body 20 and the chain guide 26. The chain guide 26 is not normally biased relative to the base member 20 toward any one of the shift positions by a biasing member. Actuation of the positioning device 22 of the front derailleur 12 is controlled by the front shifter 14F, which will be explained below.

Figure 5:
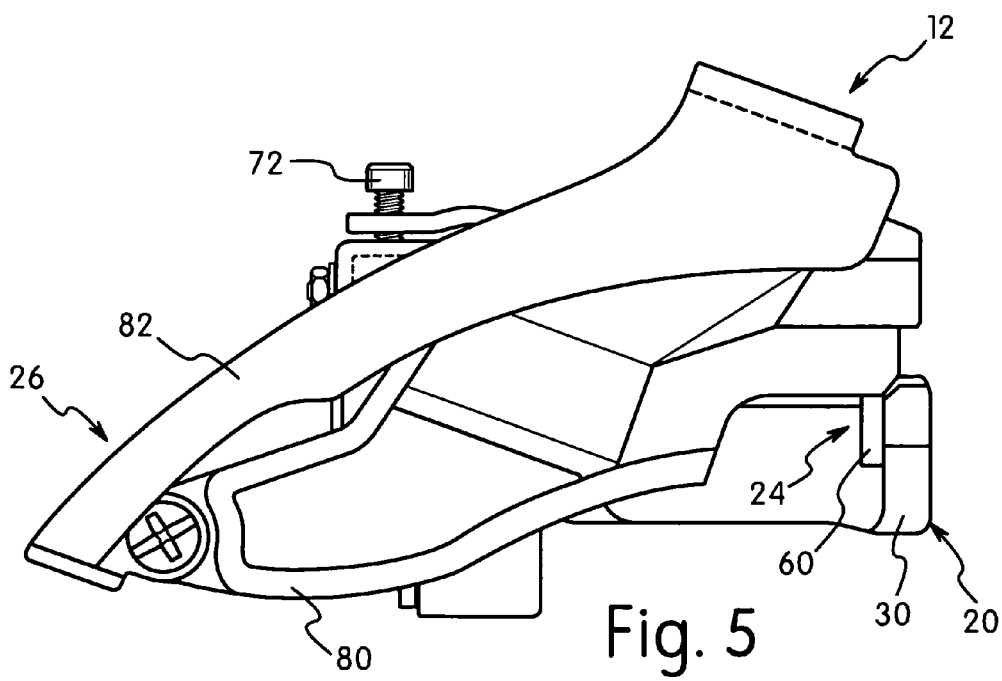
FIG. 5 is an outside, elevational view of the front derailleur illustrated in FIGS. 2-4.
Figure 6:
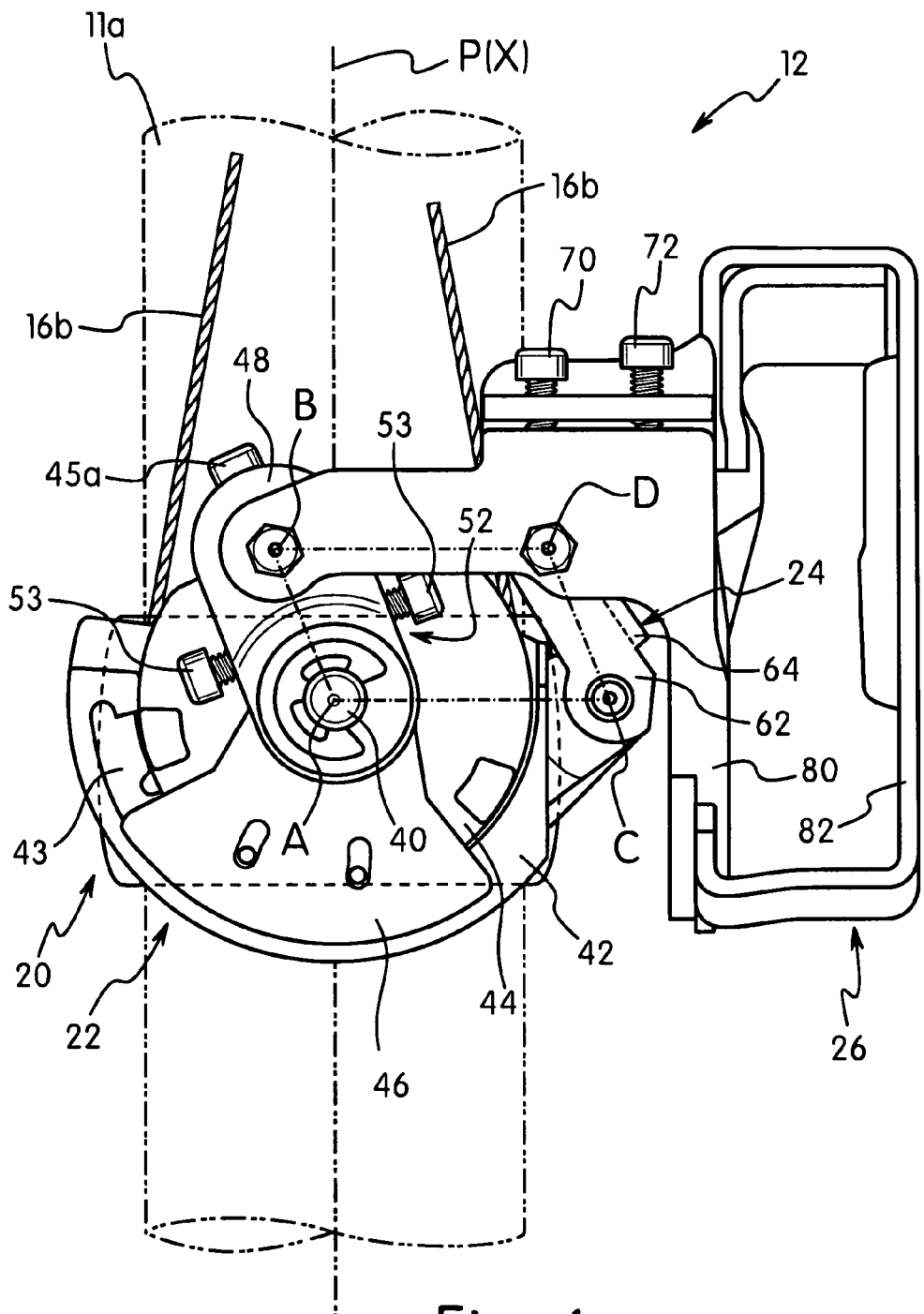
FIG. 6 is a rear elevational view of the front derailleur illustrated in FIGS. 2-5, with the chain guide in the retracted position.

The front derailleur 12 is relatively conventional, except for the positioning device 22. Accordingly, the front derailleur 12 will not be explained and/or illustrated in detail herein, except as related to the positioning device 22 of the present invention. Portions of the fixing body 20, the positioning device 22, the support link 24 and the chain guide 26 constitute parts of a four bar linkage assembly that is relatively wide. The four bar linkage assembly is preferably defined by four pivot axes A, B, C and D as best seen in FIGS. 5 and 6. A portion of the positioning device 22 defines a one link between the pivot axes A and B, a portion of the support link 24 defines one link between the pivot axes C and D, a portion of the chain guide 26 defines one link between the pivot axes B and D, and a portion of the fixing body 20 defines one link between the pivot axes A and C.

Referring to FIGS. 2-12, the fixing body 20 will now be discussed in more detail. The fixing body 20 is preferably a tubular clamping member or mechanism that is attached to the seat tube 11a of the bicycle frame 11. However, it will be apparent to those skilled in the art from this disclosure that front derailleur 12 can be coupled to other parts of the bicycle 10 such as the bottom bracket as needed and/or desired. In any event, the chain guide 26 is movably supported relative to the fixing body 20 by the positioning device 22 and the support link 24 to move laterally relative to a longitudinal center plane P of the bicycle 10 between various shift positions (i.e., at least one retracted position and at least one extended position) that correspond to the positions of the front sprockets FS. The seat tube 11a preferably includes a center axis X that lies within the longitudinal plane P.

Figure 4:
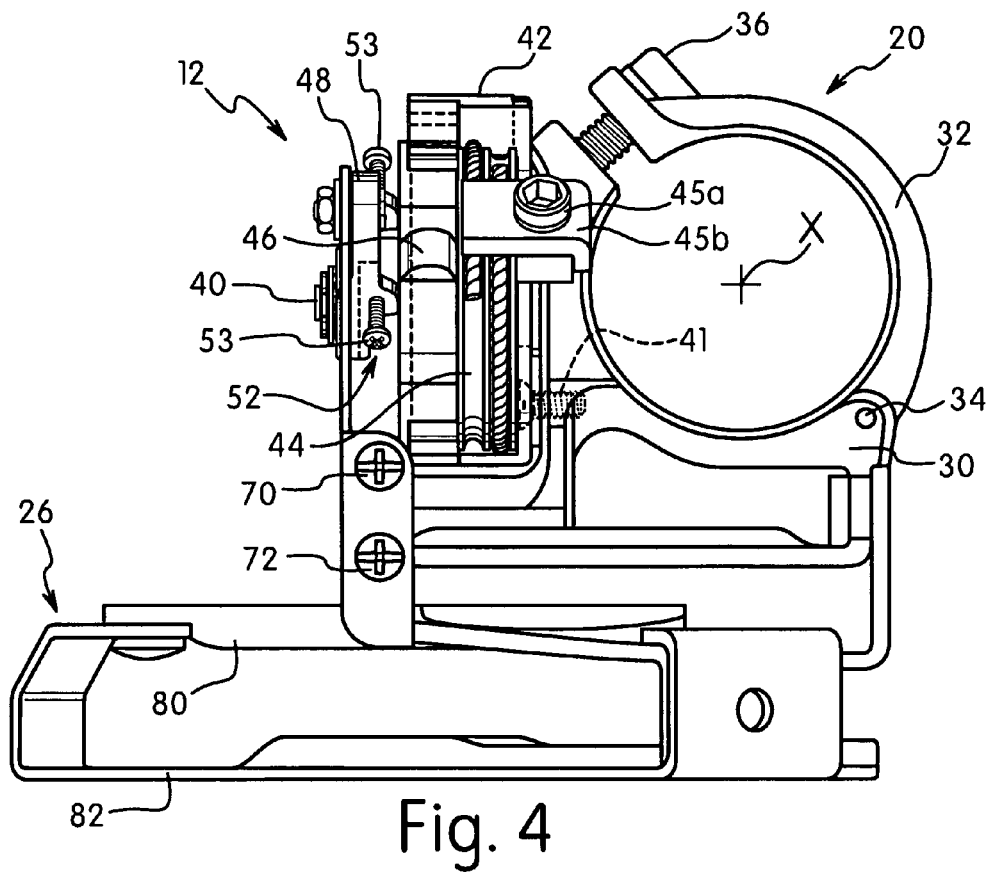
FIG. 4 is a top, plan view of the front derailleur illustrated in FIGS. 2-3, with the chain guide in the retracted position.

The fixing body 20 is preferably located beneath the chain guide 26 (at least below the top portion of the chain guide 26 that is coupled to the positioning device 22 and the support link 24) in this embodiment. The fixing body 20 basically includes a first clamping portion 30, a second clamping portion 32, a pivot pin 34 and a fastener 36, as best seen in FIG. 4. First ends of clamping portions 30 and 32 are pivotally coupled together by the pivot pin 34, which extends in a substantially vertical direction relative to the bicycle 10 in a conventional manner. The other ends of clamping portions 30 and 32 are releasably connected together via the fastener 36. The first and second clamping portions 30 and 32 are constructed of a rigid material to non-movably secure the fixing body 20 of the front derailleur 12 to the seat tube 11a of the bicycle 10. Preferably, the clamping portions 30 and 32 are constructed of metal utilizing conventional manufacturing techniques such as stamping/bending, casting and/or machining.

The first clamping portion 30 supports the chain guide 26 via the positioning device 22 and the support link 24. Specifically, the first clamping portion 30 has first and second threaded bores 30a and 30b which are configured to attach parts of the positioning device 22 therein, as explained below. The support link 24 is pivotally coupled to the first clamping portion 30 and the chain guide 26 using conventional pivot pins or the like in a conventional manner.

Referring now to FIGS. 2-49, the positioning device 22 in accordance with the present invention will now be explained. The positioning device 22 includes a main mounting axle 40, a housing member or housing member 42, a cable winding member 44, a holding or retaining part 46, an operated or linkage part 48 and a positioning mechanism 50. The positioning mechanism 50 releasably retains the cable winding member 44, the retaining part 46 and the linkage part 48 in at least two operating positions (three illustrated herein) relative to the housing member 42 in accordance with the present invention.

The main mounting axle 40 is fixed to the first clamping portion 30. Specifically, the main mounting axle 40 is threadedly attached in the mounting hole 30a of the first clamping portion 30. The housing member 42 is supported on the main mounting axle 40 and attached to the first clamping portion 30 via at least one additional fastener 41 such as a bolt attached in the hole 30b so that the housing member 42 is non-movably fixed to the first clamping portion 30 of the fixing body 20. Thus, the housing member 42, the main mounting axle 40 and the at least one additional fastener 41 constitute parts of a fixed member that is non-movably fixed to the fixing body 20 in accordance with the present invention, as best understood from FIG. 8.

The wire winding member 44, the retaining part 46 and the linkage part 48 are all pivotally supported on the main mounting axle 40 for movement about the pivot axis A. The wire winding member 44, the retaining part 46 and the linkage part 48 are connected together to selectively move the chain guide 26 between the at least two (three illustrated herein) shift positions in response to movement of the front shift control cables 16F due to actuation of the front shifter 14F. The wire winding member 44, the retaining part 46 and the linkage part 48 are not rotationally biased relative to the fixed parts of the front derailleur 12 about the pivot axis A by a biasing member. Thus, the wire winding member 44, the retaining part 46 and the linkage part 48 constitute parts of an operating member that is movably coupled to the main mounting axle 40 and the housing member 42 to move between at least two operating positions (three illustrated herein) in accordance with the present invention, as explained below.

The positioning mechanism 50 is operatively disposed between the housing member 42, the wire operating member 44 and the retaining part 46 to hold these parts in a number of operating positions (at least two) corresponding to the number of shift positions of the chain guide 26, as best understood from FIGS. 41-49. The operated or linkage part 48 is pivotally coupled to the chain guide 26 to move the chain guide 26 between the various shift positions in response to movement of the wire operating member 44 and the retaining part 46 between the various operating positions. Specifically, the linkage part 48 is attached to the retaining part 46 via an adjustment mechanism 52 such that the linkage part 48 and the retaining part 46 normally rotate together, yet relative rotational positions of the linkage part 48 and the retaining part 46 are adjustable, as explained below. Thus, when the retaining part 46 is rotated by the wire operating member 44, the linkage part 46 pivots about the pivot axis A to move the chain guide 26.

Referring to FIGS. 2-8 and 13-15, the main mounting axle 40 will now be explained in more detail. The main mounting axle 40 basically has an elongated rod-shaped configuration. The main mounting axle includes a threaded section 40a, a tool engagement section 40b, a support section 40c and a retaining section 40d that are preferably integrally formed together as a one-piece, unitary member from a light weight rigid material such as a metallic material using conventional manufacturing techniques such as casting and/or machining.

The threaded section 40a is received in the threaded bore 30a of the first clamping portion. The tool engagement section 40b is used to rotate the main mounting axle during attachment to the first clamping portion 30, and also spaces the housing member 42 from the first clamping portion 30. The support section 40c pivotally supports the housing member 42, the wire operating member 44, the retaining part 46 and the linkage part 48. However, the housing member 42 is non-movable relative to the first clamping portion 30 due to the at least one fastener 41. Preferably, an additional spacing washer is disposed on the at least one fastener 41 between the first clamping portion 30 and the housing member 42. The retaining section 40d has an annular groove, which receives a retaining clip or the like to retain the wire operating member 44, the retaining part 46 and the linkage part 48 on the support section 40c.

Referring to FIGS. 2-8, 16-19, 23 and 24, the housing member 42 will now be explained in more detail. The housing member 42 is basically a cup-shaped member with an open end for receiving the front shift cable 16F. The housing member includes a base plate 42a and a generally semi-annular wall 42b with an arc-shaped recess 42c formed therein. The base plate 42a and the generally semi-annular wall 42b with the arc-shaped recess 42c are preferably integrally formed together as a one-piece, unitary member from a light weight rigid material such as a metallic material using conventional manufacturing techniques such as casting and/or machining.

The base plate 42a has holes formed therein for receiving the main mounting axle 40 and the at least one fastener 41. The generally semi-annular wall 42b extends in a direction parallel to the pivot axis A from the base plate 42a. The arc shaped recess 42c receives an arc-shaped engagement member 43 (FIGS. 23 and 24), which releasably engages a part of the positioning mechanism 50. Specifically, the engagement member 43 preferably includes a number of notches 43a corresponding to the desired number of operating portions of the positioning device 22. The notches 43a constitute a mating structure of the housing member 42 (fixed member). The engagement member 43 is preferably constructed of a light-weight, rigid material with a relatively low coefficient of friction such as a plastic material. In this embodiment, the engagement member 43 is constructed as a one-piece member that is axially slid into the arc-shaped recess 42c.

Referring to FIGS. 2-8 and 20-22, the wire operating member 44 will now be explained in more detail. The wire operating member 44 basically has a disc-shaped (ring) configuration. The wire operating member 44 includes a main body portion 44a, a pair of actuating projections 44b, a cable attachment projection 44c, a hold/release part 44d and a pair of circumferential winding grooves 44e extending about the main body portion 44a. The main body portion 44a is mounted on the main pivot axle 40 (a pivot structure) by a portion disposed on the main pivot axle 40 which defines an opening and constitutes an input mounting part. Preferably, the main body portion 44a, the pair of actuating projections 44b, the cable attachment projection 44c and the hold/release part 44d are preferably integrally formed together as a one-piece, unitary member from a light weight rigid material such as a metallic material using conventional manufacturing techniques such as casting and/or machining. The wire winding member 44 constitutes an input portion of the operating member.

Figure 21:
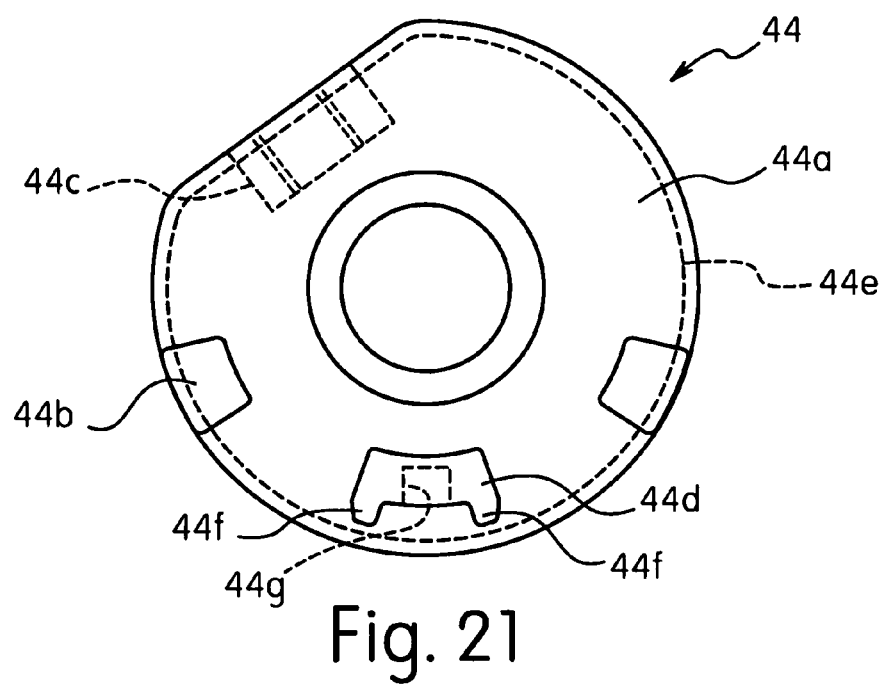
FIG. 21 is an end elevational view of the wire winding member illustrated in FIG. 20.
Figure 22:
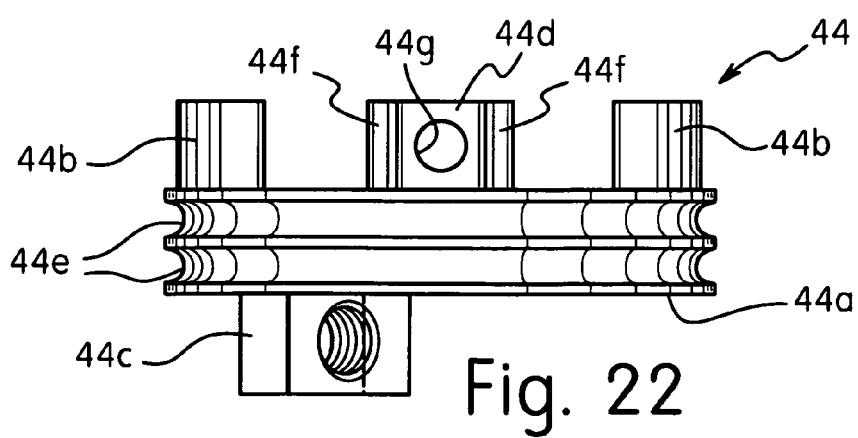
FIG. 22 is a bottom, plan view of the wire winding member illustrated in FIGS. 20 and 21.
Figure 23:
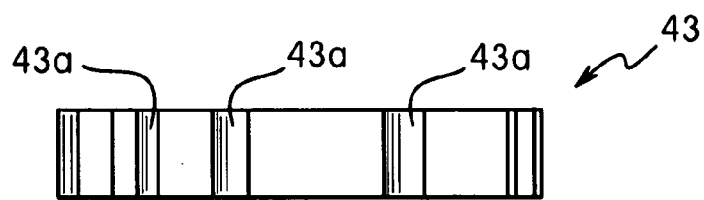
FIG. 23 is a top, plan view of the engagement member of the front derailleur positioning device of the front derailleur illustrated in FIGS. 2-8.
Figure 24:
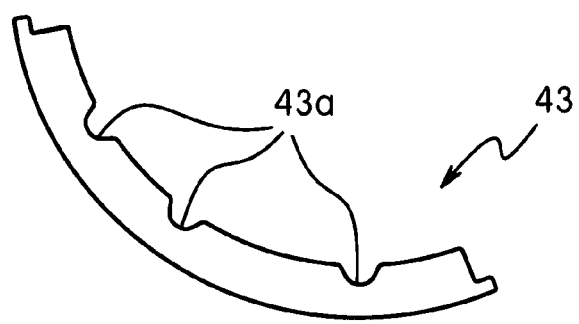
FIG. 24 is an end elevational view of the engagement member illustrated in FIG. 23.

The actuating projections 44b and the hold release part 44d extend from one axial side of the body portion 44a, while the cable attachment projection 44c extends from the opposite axial side of the body portion 44. The cable attachment projection 44c has a threaded hole that receives a fastener 45a such as a bolt in order to attach an L-shaped cable attachment plate 45b to the cable attachment projection 44c. The L-shaped cable attachment plate 45b holds the inner wires 16b of the front shift cables 16F in the wire winding grooves 44e as best understood from FIGS. 2-4 and 8. The outer peripheral surface of the body portion 44a has one flat side as seen in FIG. 21 to facilitate clamping the front shift cables 16F thereto. The wire winding grooves 44e can be shallower along this flat side.

Figure 7:
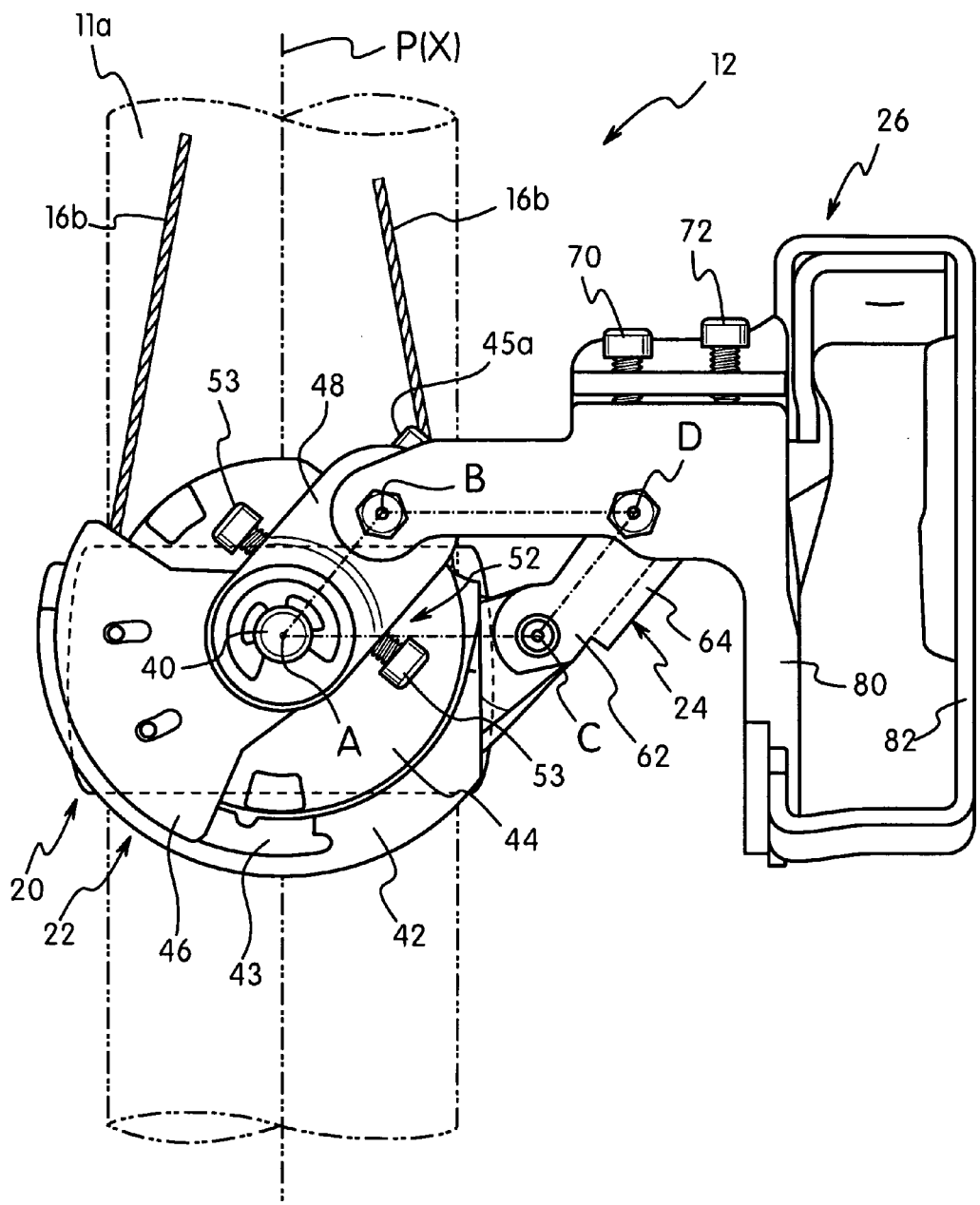
FIG. 7 is a rear elevational view of the front derailleur illustrated in FIGS. 2-5, with the chain guide in an extended position.
Figure 8:
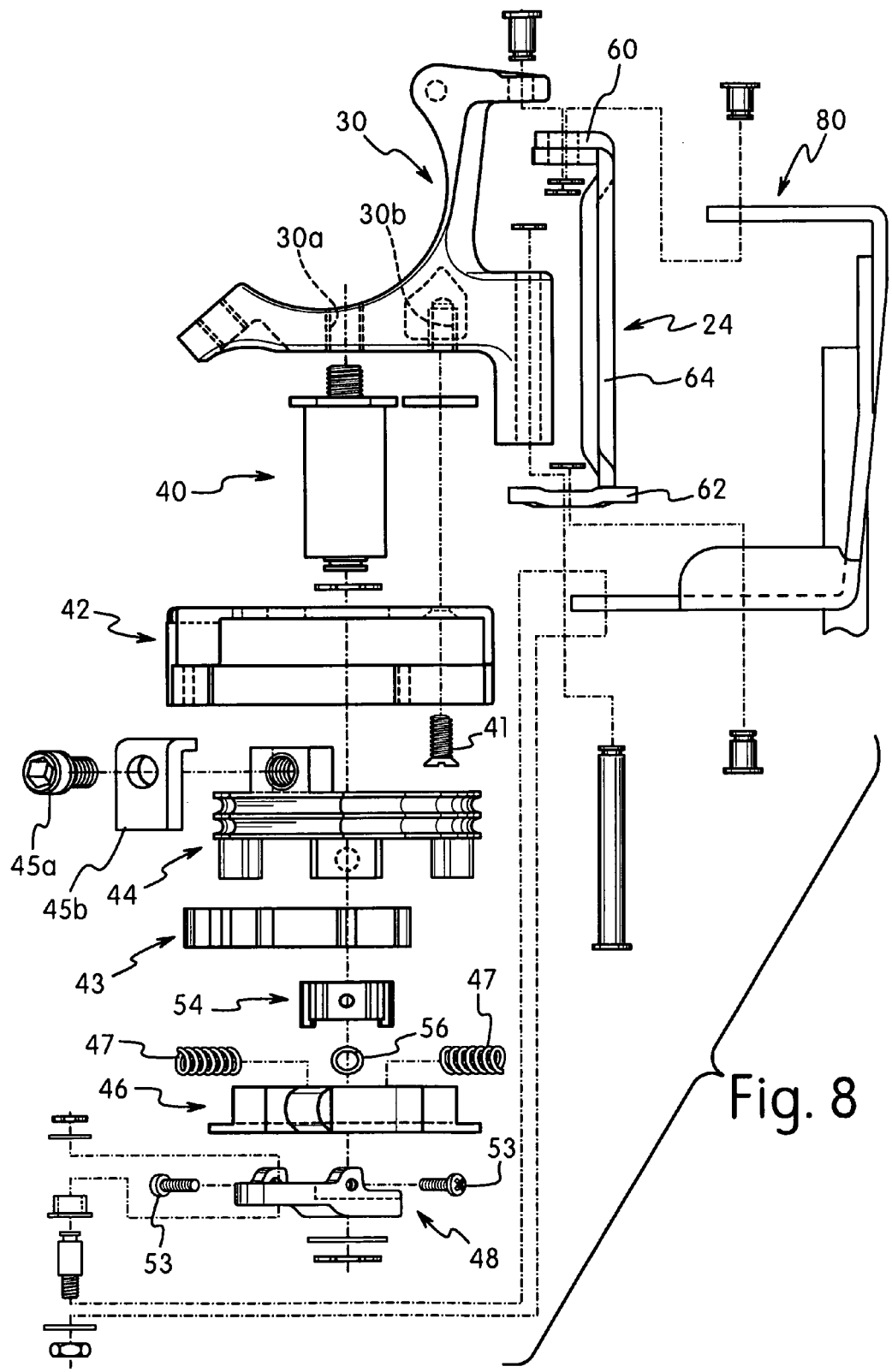
FIG. 8 is an exploded, (top, plan) view of the front derailleur illustrated in FIGS. 2-7.
Figure 9:
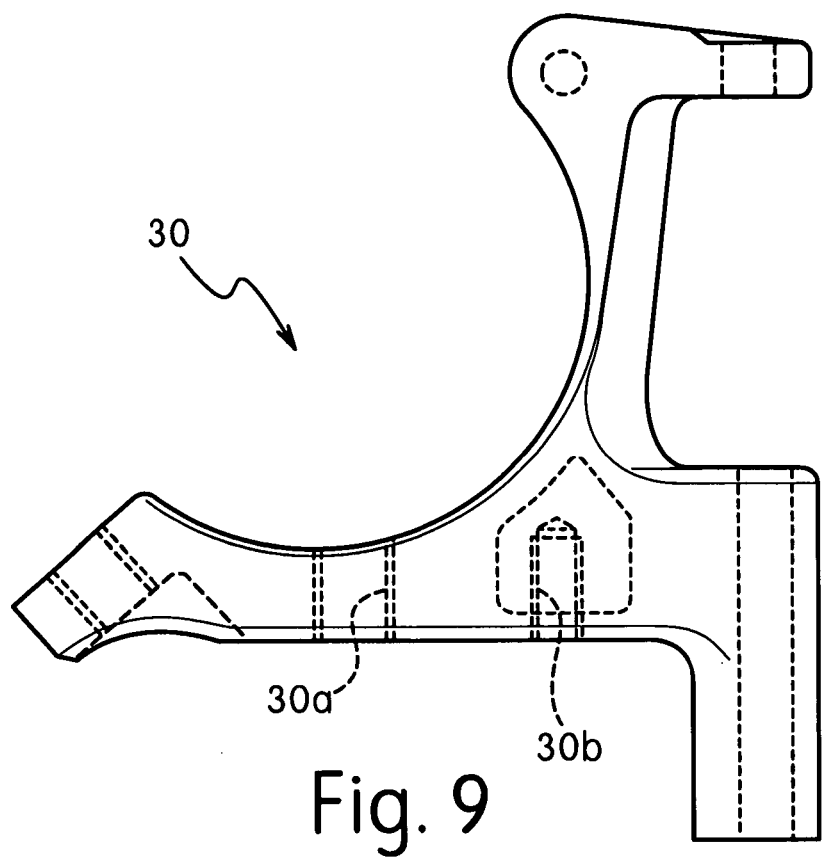
FIG. 9 is an enlarged, top plan view of the first clamping portion of the fixing body of the front derailleur illustrated in FIGS. 2-8.
Figure 10:
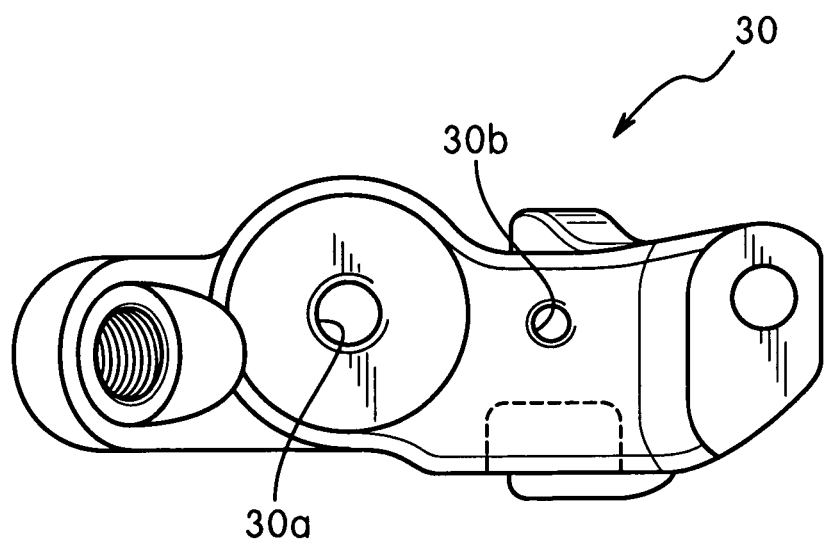
FIG. 10 is a rear end elevational view of the first clamping portion illustrated in FIG. 9.
Figure 11:
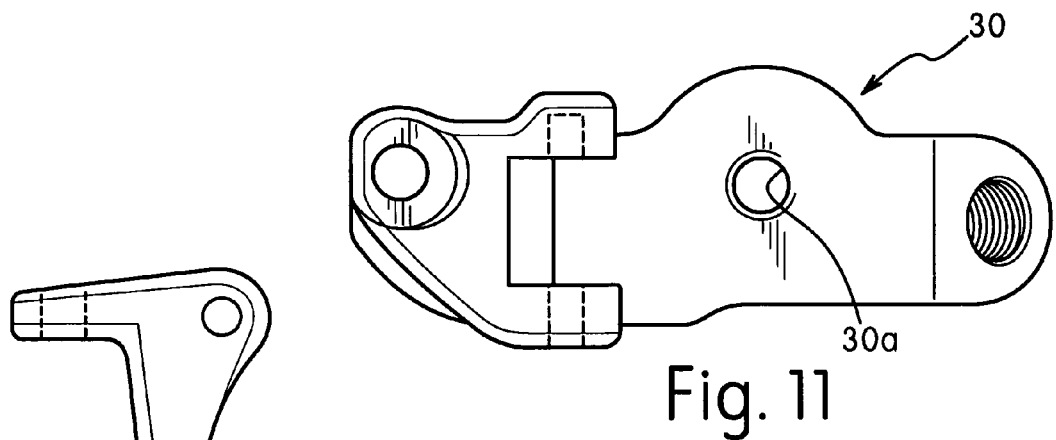
FIG. 11 is an opposite (front) end elevational view of the first clamping portion illustrated in FIGS. 9 and 10.
Figure 12:
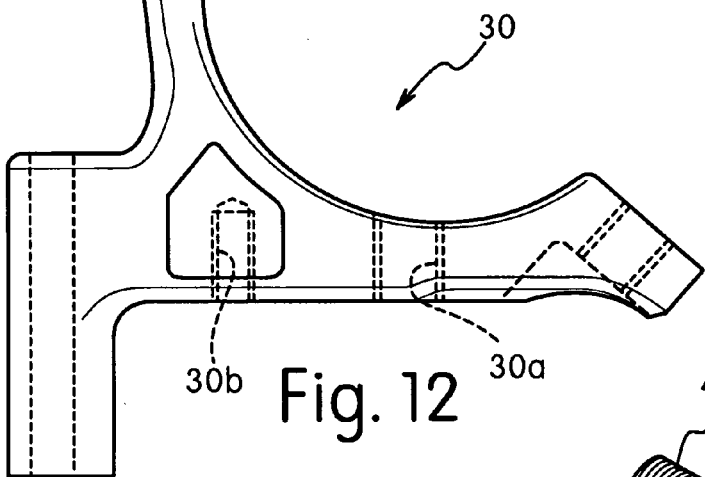
FIG. 12 is a bottom plan view of the first clamping portion illustrated in FIGS. 9-11.
Figure 13:
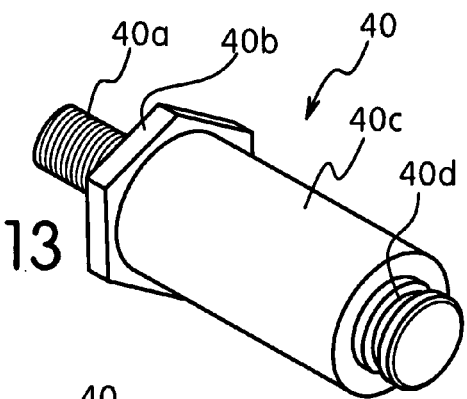
FIG. 13 is an enlarged perspective view of the main mounting axle of the front derailleur positioning device of the front derailleur illustrated in FIGS. 2-8.
Figure 14:
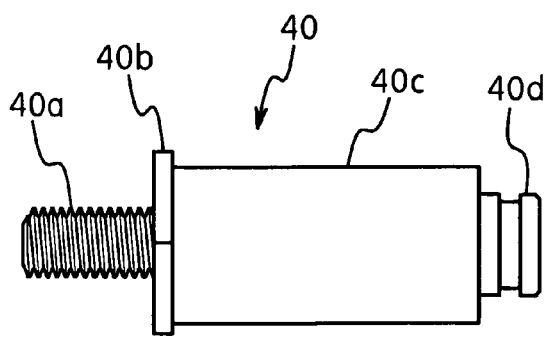
FIG. 14 is a side elevational view of the main mounting axle illustrated in FIG. 13.
Figure 15:
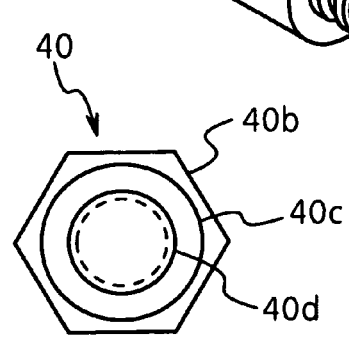
FIG. 15 is an end elevational view of the main mounting axle illustrated in FIGS. 13 and 14.
Figure 16:
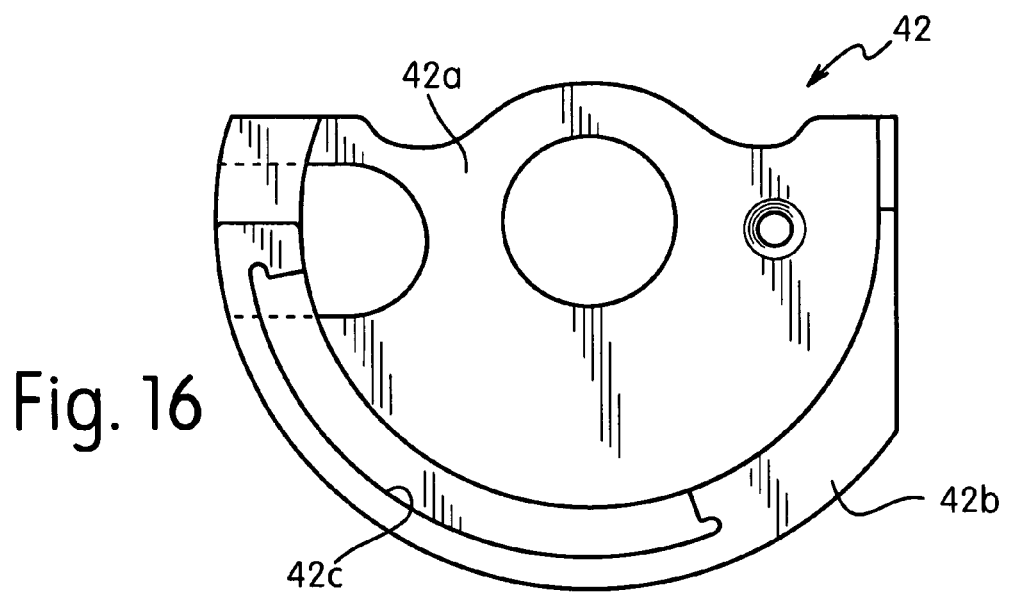
FIG. 16 is an end elevational view of the support member or housing member of the front derailleur positioning device of the front derailleur illustrated in FIGS. 2-8.
Figure 17:
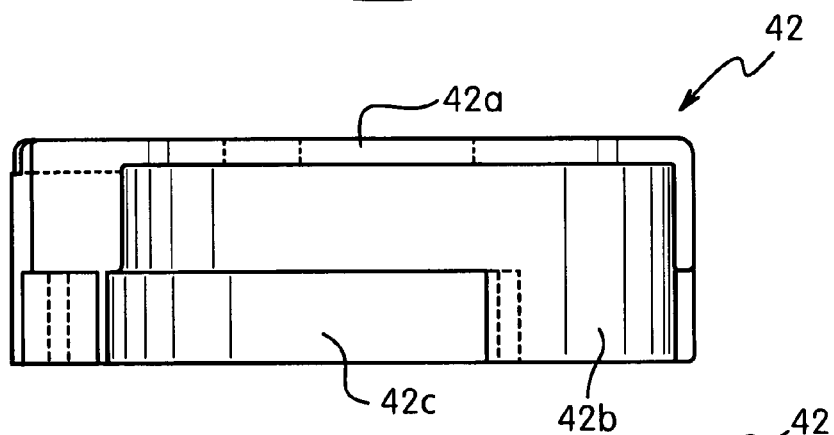
FIG. 17 is top, plan view of the support member illustrated in FIG. 16.
Figure 18:
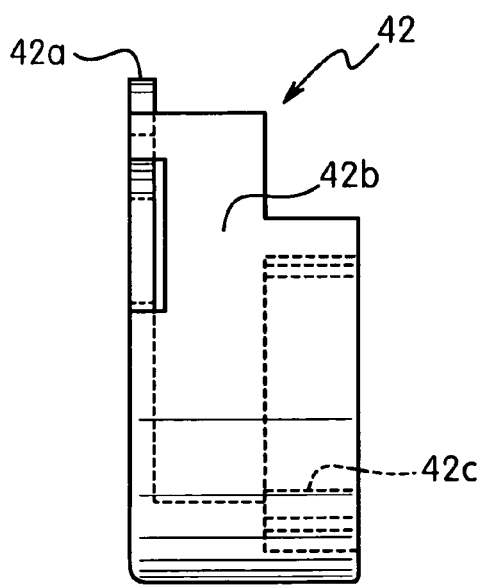
FIG. 18 is a first side elevational view of the support member illustrated in FIGS. 16 and 17.
Figure 19:
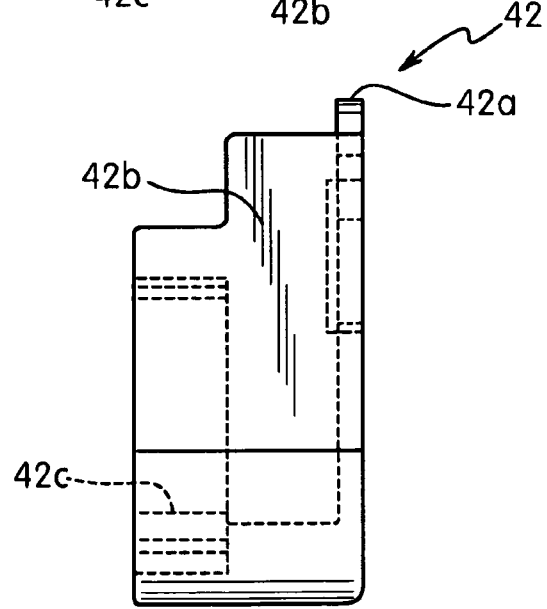
FIG. 19 is a second (opposite) side elevational view of the support member illustrated in FIGS. 16-18.
Figure 20:
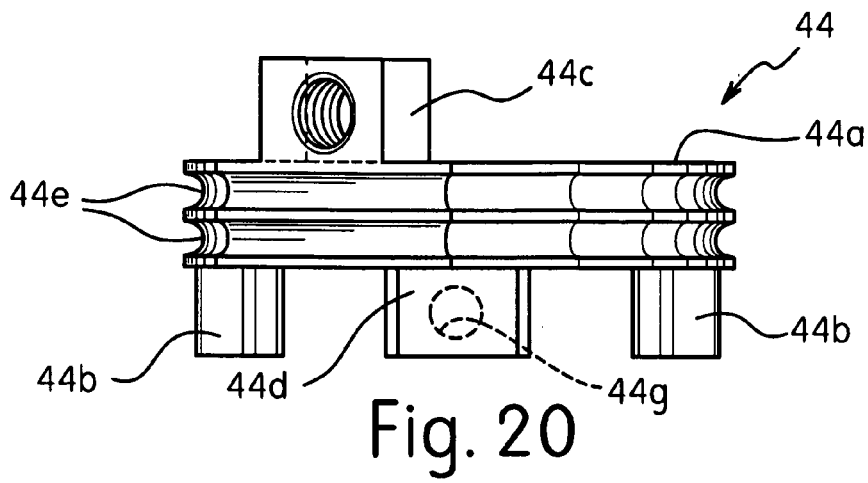
FIG. 20 is a top, plan view of the wire winding member of the front derailleur positioning device of the front derailleur illustrated in FIGS. 2-8.

The inner wires 16b extend in opposite circumferential directions from the L-shaped cable attachment plate 45b in the wire winding grooves 44e around the main body portion 44a and upwardly along the seat tube 11a, as seen in FIGS. 6 and 7. The wire winding grooves 44e, the cable attachment projection 44c, the fastener 45a and the L-shaped plate 45b constitute parts of a cable attachment structure, which fixedly attaches the free ends of the inner wires 16*b* of the front shift cables 16F to the wire operating member 44. The front shifter 14F pulls one of the inner wires 16*b* of the front shift cables 16F, while the other of the inner wires 16*b* of the front shift cables 16F is released a corresponding amount by the front shifter 14F in order to rotate the wire operating member 44 back and forth about the pivot axis A.

The actuating projections 44*b* are circumferentially spaced from each other about the pivot axis A. The actuating projections 44*b* are arranged and configured to contact the retaining part 46 after the wire operating member 44 moves a predetermined amount about the pivot axis A from the operating positions. The retaining part 46 rotates with the wire operating member 44 after the wire operating member 44 moves the predetermined amount about the pivot axis A from the operating positions. The wire operating member 44 is preferably movable back and forth in opposite rotational directions. The actuating projections 44*b* constitute parts of an actuating portion of the input portion of the positioning device 22 in accordance with the present invention.

The hold/release part 44*d* of the wire operating member 44 disengages the positioning mechanism 50 when the wire operating member 44 is moved the predetermined amount about the pivot axis A from the operating positions, as explained below. The hold/release part 44*d* is preferably circumferentially equally spaced from the actuating projections 44*b* such that predetermined amount about the pivot axis A from the operating positions is the same in both rotational directions. The hold/release part 44*d* has an arc-shaped configuration with a pair of end projections 44*f* extending radially outwardly therefrom, and a blind bore 44*g* extending radially inwardly from an outer surface of the hold/release part 44*d*. The hold/release part is configured and arranged to selectively maintain/release the positioning mechanism 50 to prevent/allow rotation of the retaining part 46, as explained below.

Referring now to FIGS. 2-8 and 28-33, the retaining part 46 will now be explained in more detail. The retaining part 46 is a generally pie-shaped member, which includes a pair of oppositely facing circumferential abutment surfaces 46*a*, an adjustment protrusion 46*b*, a pair of arc-shaped slots 46*c* and a positioning recess 46*d*. Preferably, the retaining part 46 is integrally formed as a one-piece, unitary member from a light weight rigid material such as a metallic material using conventional manufacturing techniques such as casting and/or machining.

The actuating projections 44*b* of the wire operating member 44 selectively contact the abutment surfaces 46*a* such that the wire operating member 44 moves the retaining part 46 after a predetermined amount of relative rotation therebetween (i.e. in each rotational direction). The adjustment protrusion 46*b* contacts a pair of screws 53 that are attached to the linkage part 48. Thus, the relative rotational positions of the retaining part 46 and the linkage part 48 can be adjusted by rotating the screws 53. The adjustment protrusion 46*b* and the screws 53 constitute parts of the adjustment mechanism 52. Normally, the screws 53 are tightened so that the retaining part 46 and the linkage part 48 are not rotationally movable relative to each other. However, when the relative positions of the retaining part 46 and the linkage part 48 need to be adjusted, one of the screws 53 is loosened, and the other screw 53 is tightened a corresponding amount.

The positioning recess 46*d* receives the hold/release part 44*d* therein with a pair of biasing elements (springs) 47 disposed on opposite circumferential sides of the hold/release 44*d* to normally maintain the retaining part 46 in a stationary intermediate position between two end positions of the limited rotational movement relative to the wire operating member 44, as seen in FIGS. 41, 45, 46 and 49. However, due to the configuration of the recess 46*b*, the biasing elements 47 and the hold/release part 44*d* of the wire operating member 44, there is a limited amount of relative rotational movement permitted between the wire operating member 44 and the retaining part 46, as best understood from FIGS. 42-44, 47 and 48. Part of the positioning mechanism 50 is also received in the recess 46*b* and in the slots 46*c*, as explained below.

Referring now to FIGS. 2-8 and 34-40, the linkage part 48 will now be explained in more detail. The linkage part 48 basically includes a first end 48*a*, a second end 48*b* and a pair of adjustment flanges 48*c*. Preferably, the linkage part 48 is integrally formed as a one-piece, unitary member from a light weight rigid material such as a metallic material using conventional manufacturing techniques such as casting and/or machining. The first end 48*a* is pivotally mounted on the main mounting axle 40. The second end 48*b* is pivotally attached to the chain guide 26 using a conventional pivot pin or pivot bolt, The adjustment protrusion 46*b* is disposed between the adjustment flanges 48*c* such that the screws 53 can be threadedly attached to the adjustment flanges 48*c* and contact the adjustment protrusion 46*b*. Thus, when the retaining part 46 rotates about the pivot axis A, the linkage part 48 rotates about the pivot axis A to move the chain guide 26. The retaining part 46 and the linkage part 48 constitute two parts of an output portion of the operating member. The retaining part 46 and the linkage part 48 have respective portions disposed on the main pivot axle 40 (the pivot structure) which define openings and together constitute an output mounting part. The adjustment flanges 48*c* together with the adjustment protrusion 46*b* and the screws 53 constitute parts of the adjustment mechanism 52 between the retaining part 46 and the linkage part 48.

Figure 25:
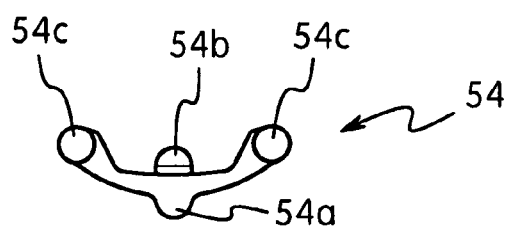
FIG. 25 is an end elevational view of the positioning member of the front derailleur positioning device of the front derailleur illustrated in FIGS. 2-8.
Figure 26:
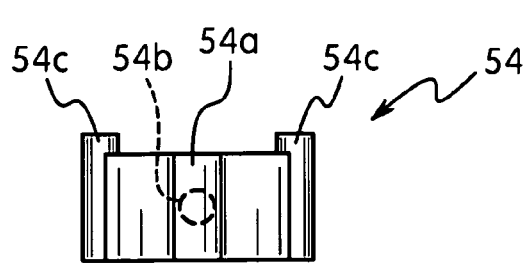
FIG. 26 is a top, plan view of the positioning member illustrated in FIG. 25.
Figure 27:
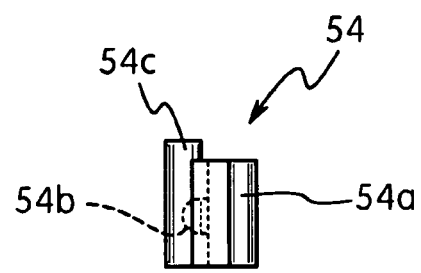
FIG. 27 is a side elevational view of the positioning member illustrated in FIGS. 26 and 27.
Figure 41:
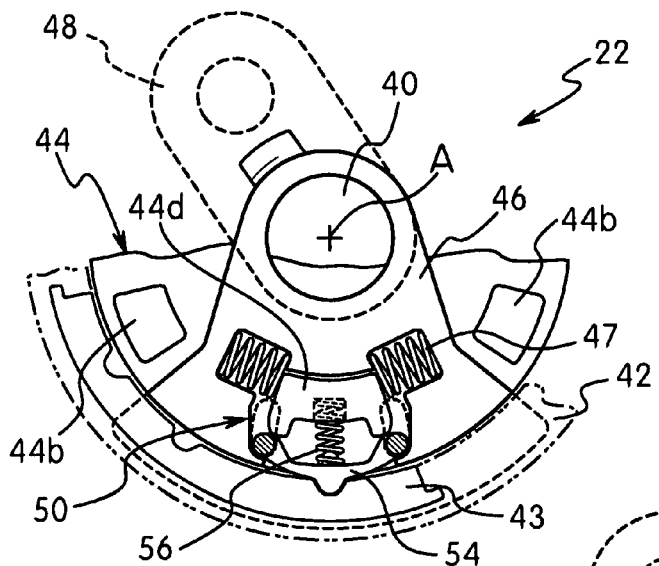
FIG. 41 is a partial, diagrammatic end elevational view of the front derailleur positioning device of the front derailleur illustrated in FIGS. 2-8, with the operating member in a first operating position such that the positioning member is held in a first position in engagement with the engagement member.
Figure 42:
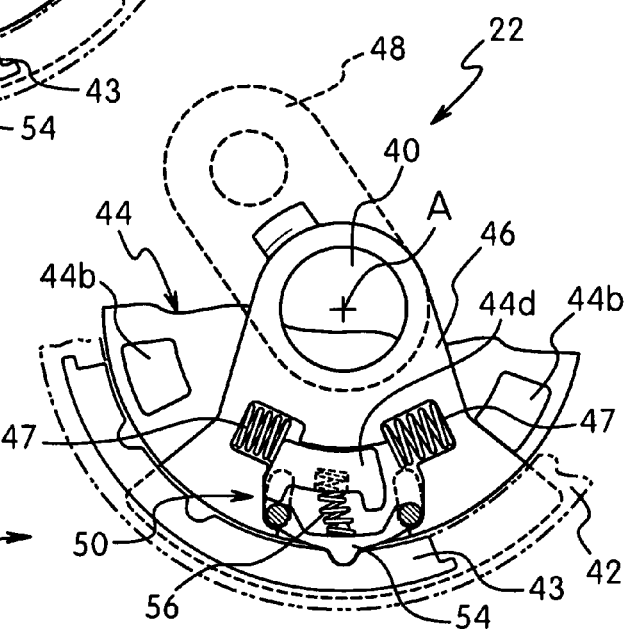
FIG. 42 is a view of the front derailleur positioning device illustrated in FIG. 41, with the operating member moved to a first intermediate position from the first operating position such that the positioning member is no longer held in engagement with the engagement member.
Figure 43:
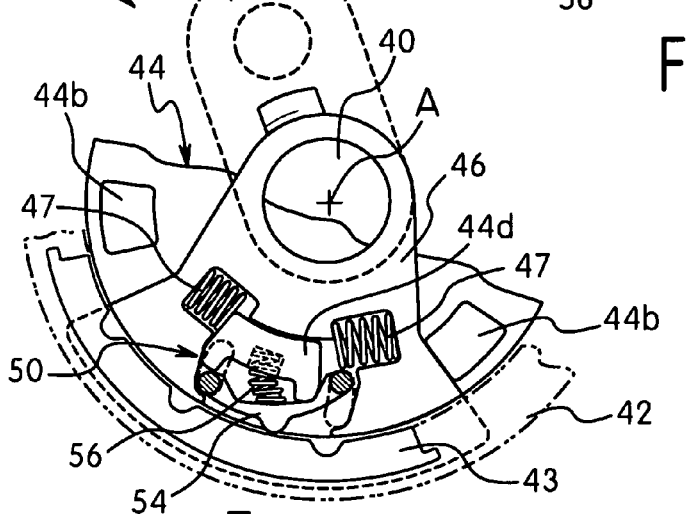
FIG. 43 is a view of the front derailleur positioning device illustrated in FIGS. 41 and 42, with the operating member moved to a second intermediate position from the first intermediate position illustrated in FIG. 42 and with the positioning member moved to a second position out of engagement with the engagement member.
Figure 44:
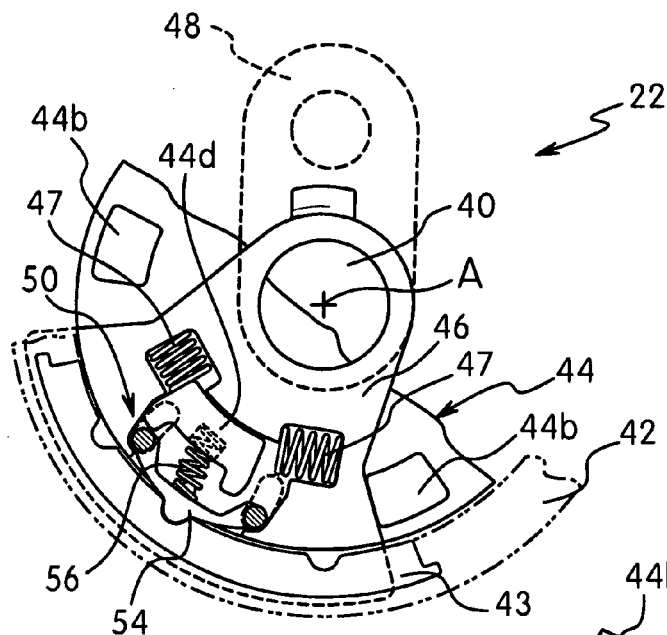
FIG. 44 is a view of the front derailleur positioning device illustrated in FIGS. 41-43, with the operating member moved to a third intermediate position from the second intermediate position illustrated in FIG. 43 such that the positioning member moves back into engagement with the engagement member.
Figure 45:
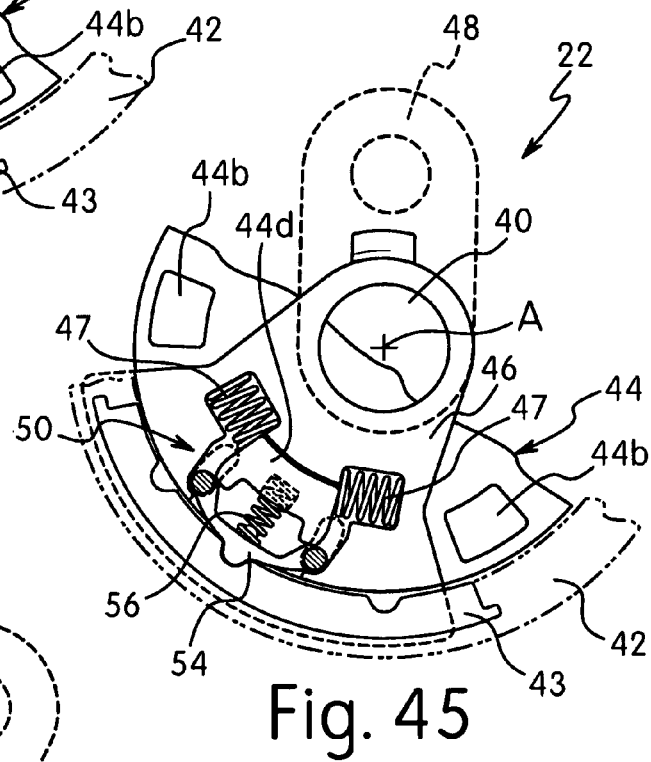
FIG. 45 is a view of the front derailleur positioning device illustrated in FIGS. 41-44, with the operating member moved to a second operating position from the third intermediate position illustrated in FIG. 44 such that the positioning member is held in engagement with the engagement member.
Figure 46:
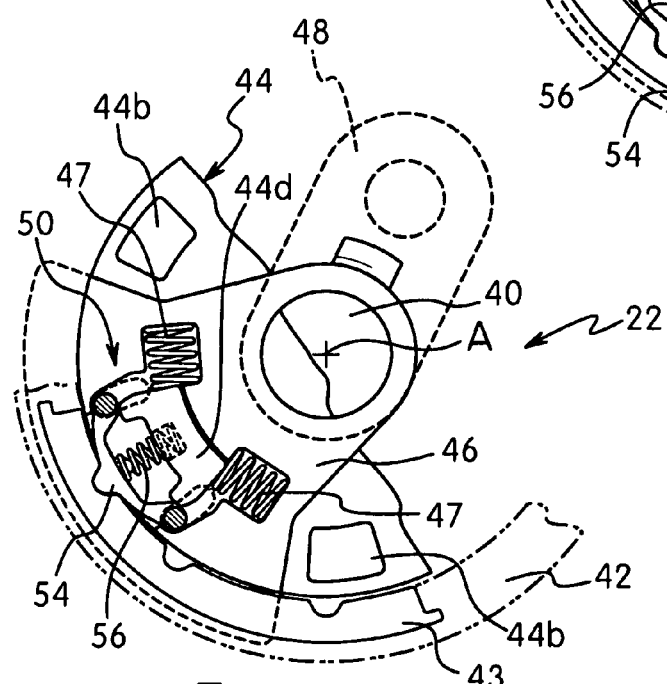
FIG. 46 is a view of the front derailleur positioning device illustrated in FIGS. 41-45, with the operating member in a third operating position such that the positioning member is held in engagement with the engagement member.
Figure 47:
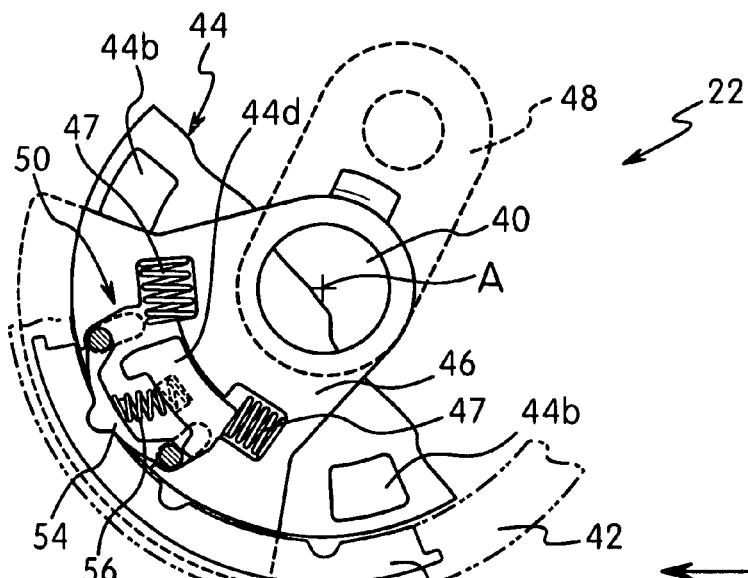
FIG. 47 is a view of the front derailleur positioning device illustrated in FIG. 41-46, with the operating member moved to a first intermediate position from the third operating position illustrated in FIG. 46 such that the positioning member is no longer held in engagement with the engagement member.
Figure 48:
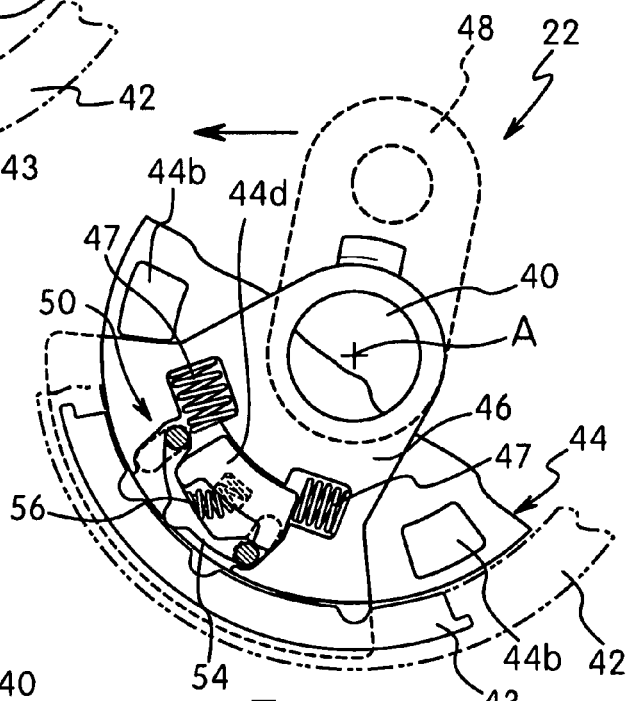
FIG. 48 is a view of the front derailleur positioning device illustrated in FIGS. 41-47, with the operating member moved to a second intermediate position from the first intermediate position illustrated in FIG. 47 and with the positioning member moved to a second position out of engagement with the engagement member.
Figure 49:
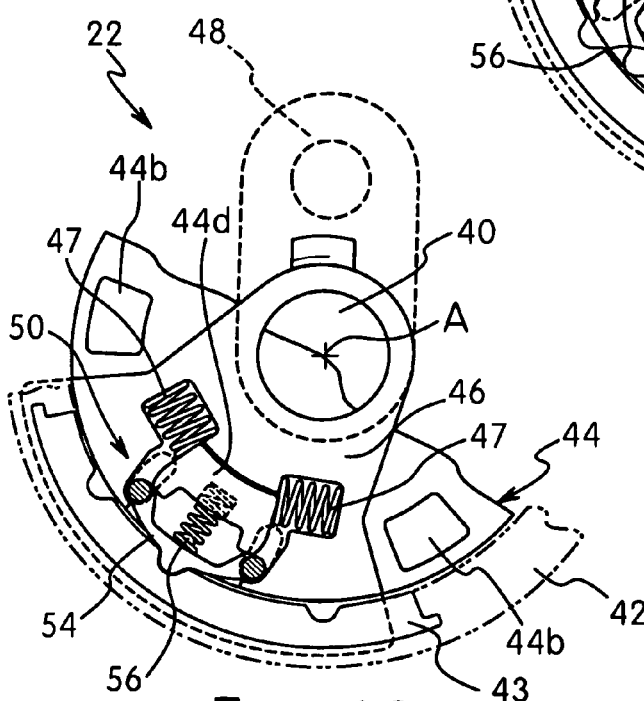
FIG. 49 is a view of the front derailleur positioning device illustrated in FIGS. 41-48, with the operating member moved to the second operating position from the second intermediate position illustrated in FIG. 48 (i.e. third intermediate position not shown) such that the positioning member back into engagement with the engagement member.

Referring to FIGS. 25-27, the positioning mechanism 50 will now be explained in more detail. The positioning mechanism 50 basically includes a positioning member 54 as well as parts/portions of the wire operating member 44 (e.g. the hold/release part 44*d*), the retaining part 46 (e.g., the slots 46*c* and the positioning recess 46*d*) and the housing member 42 (e.g., the engagement member 43). The positioning member is an arc-shaped member, which includes a central engagement projection 54*a*, a central spring support projection 54*b* and a pair of pins 54*c* disposed at opposite ends thereof. The positioning member 54 is preferably constructed as a one-piece, unitary member from a light weight rigid material such as a metallic material using conventional manufacturing techniques such as casting and/or machining. Preferably, the positioning member 54 is constructed of a material, which does not deform during use (i.e. a relatively inelastic, rigid material).

Referring to FIGS. 2-49, the positioning member 54 is disposed within the positioning recess 46*d* of the retaining part together with the hold/release part 44*d*. The pins 54*c* of the positioning member 54 are received in the slots 46*c* to control movement of the positioning member 54. A radial biasing member 56 is mounted on the central spring support projection 54*b* and received in the blind bore 44*g* of the hold/release part 44*d* to normally bias the positioning member toward a first position in engagement with the engagement member 43. Moreover, when the wire operating member 44 is in one of the operating positions, the pair of end projections 44*f* hold (the pins 54*c*) positioning member 54 in the first position.

However, when the wire operating member 44 pivots a predetermined amount relative to the retaining part 46, only one of the pins 54*c* is held, while the other pin 54*c* is movable in its respective slot 46*c*. Thus, when this occurs, the positioning member 54 can move to a second position disengaged from the engagement member 43. In other words, the positioning member 54 selectively pivots about one of the pins 54c such that the other pin 54c slides in its respective slot 46c when the positioning member 54 moves from the first position to the second position. Such movement of the positioning member 54 from the first position to the second position is illustrated in FIGS. 41-43 and 46-48. In other words, the biasing elements 47 normally maintain the wire operating member 44 in a holding (intermediate) position to hold the positioning member 54 in engagement with a mating structure of the engagement member 43 when the wire operating member 44 is in each of the operating positions.

Referring again to FIGS. 2-8, the support link 24 includes a pair (front and rear) of link plates 60 and 62 with a connecting portion 64 extending between the link plates 60 and 62. The support link 24 is preferably constructed of a hard rigid material. For example, the support link is preferably constructed of metal utilizing conventional manufacturing techniques such as stamping/bending, casting and/or machining. When the front derailleur 12 is assembled, the link plates 60 and 62 are substantially vertical plates, while the connecting portion 64 extends in a longitudinal direction relative to the bicycle 10.

The link plates 60 and 62 are pivotally coupled to the first clamping portion 30 of the fixing body 20 via conventional pivot pins or the like in a conventional manner. The link plates 60 and 62 are also pivotally coupled to the chain guide 26 via conventional pivot pins or the like in a conventional manner, in order to pivotally support the chain guide 26. The link plate 60 is provided with a fan-shaped end that selectively engages adjustment screws 70 and 72 for limiting movement of chain guide 26 in its extended most position and its retracted most position, respectively, in a conventional manner. The adjustment screws 70 and 72 are threadedly attached to the chain guide 26. Thus, the adjustment screw 70 is a high adjustment screw that limits outward movement of the chain guide 26 in its (top) extended most position, while the adjustment screw 72 is a low adjustment screw that limits inward movement of the chain guide 26 in its (low) retracted most position.

Referring still to FIGS. 2-8, the chain guide 26 includes an inner guide plate 80 and an outer guide plate 82 rigidly connected to the inner guide plate 80 in a spaced arrangement to form a chain receiving area therebetween. Each of the guide plates 80 and 82 is preferably constructed of a hard rigid material. For example, each of the guide plates 80 and 82 of the chain guide 26 is preferably constructed of metal such as a rigid sheet metal that is bent to the desired shape. The inner and outer guide plates 80 and 82 are preferably connected together at the front of the chain guide 26 and at the rear of the chain guide 26. The inner guide plate 80 is pivotally coupled to the positioning device 22 (i.e. the linkage part 48) using the pivot pin or pivot bolt, and pivotally coupled to the link plates 60 and 62 of the support link 24.

Rear Derailleur

Figure 50:
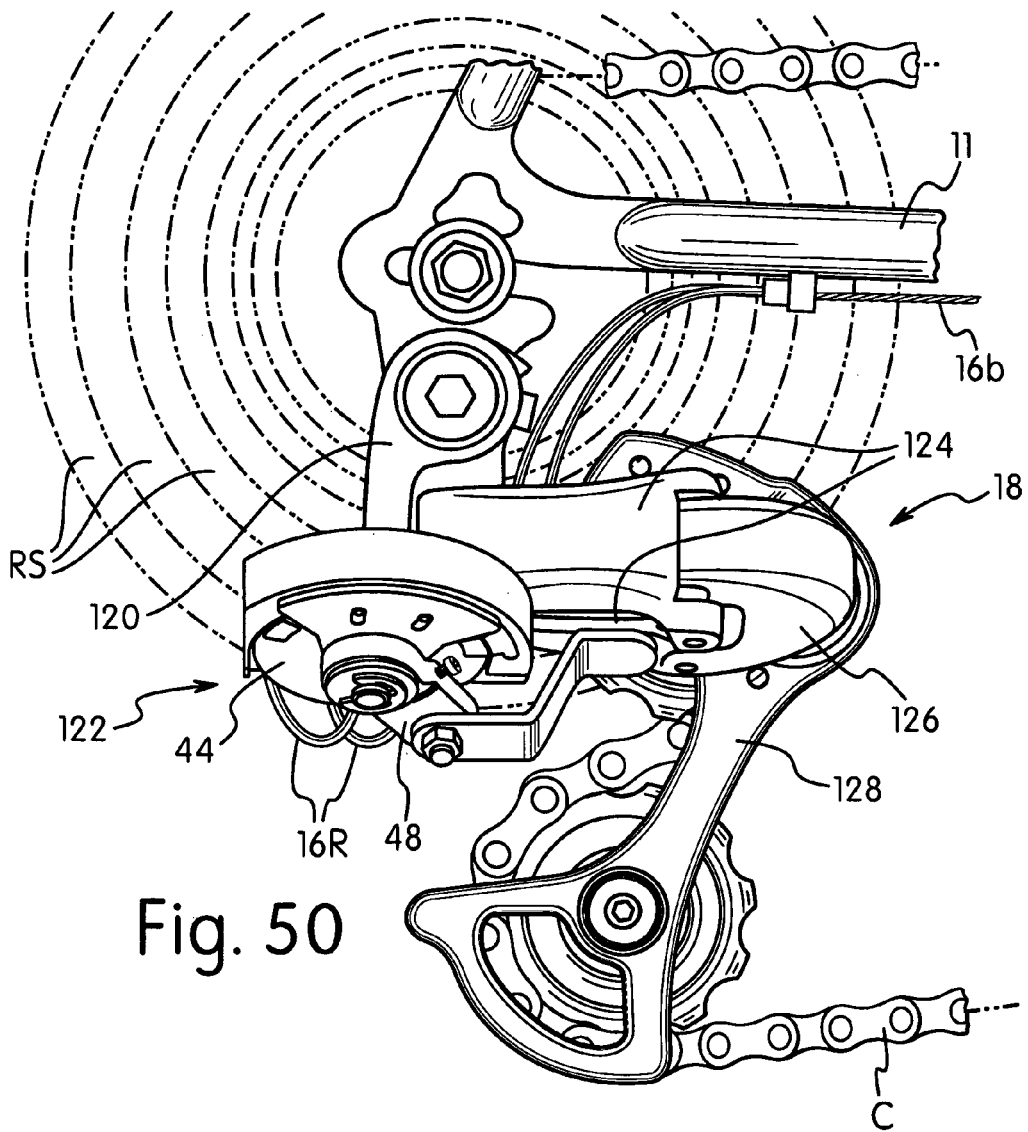
FIG. 50 is an enlarged, side elevational view of the rear derailleur of the rear shifting system illustrated in FIG. 1.
Figure 51:
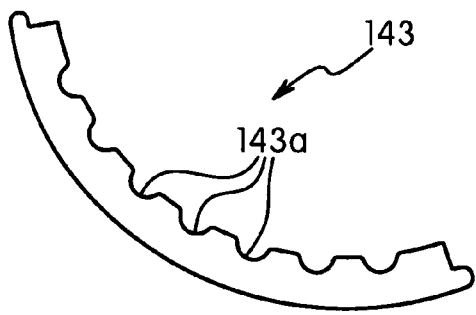
FIG. 51 is an end elevational view of the engagement member of the rear derailleur positioning device of the rear derailleur illustrated in FIG. 1 and 50.
Figure 52:
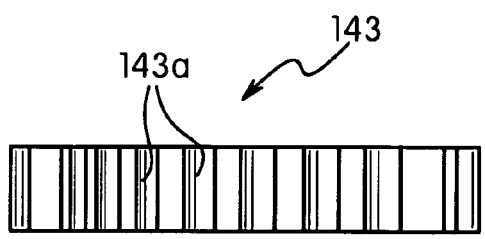
FIG. 52 is a top, plan view of the engagement member illustrated in FIG. 51.

Referring now to FIGS. 50-52, the rear derailleur 18 of the rear shifting system in accordance with the present invention will now be explained in more detail. The rear derailleur 18 includes a fixing body or base member 120, a rear derailleur (component) positioning device 122, a pair of links 124 and a movable member 126 supporting a rear chain guide 128 in accordance with the present invention. The fixing body 120 is fixedly attached to the rear triangle of the frame 11 in a conventional manner. The links 124 are pivotally coupled between the base member 120 and the movable member 126 to form a four bar linkage in a conventional manner. The positioning device 122 has a pivot axis that is common to one of the pivot axes of the links 124 at the base member 120 and is coupled to the link 124 having a common pivot axis therewith. Thus, the positioning device 122 will rotate one of the links 124 in response to pulling and releasing the inner wires 16b of the rear shift cables 16R to move the movable member 126 and chain guide 128 laterally over the rear sprockets RS. The movable member 126 and chain guide 128 are not normally biased relative to the base member 120 toward any one of the shift positions by a biasing member. Actuation of the positioning device 122 of the rear derailleur 18 is controlled by the rear shifter 14R, which will be explained below.

The rear derailleur 18 is relatively conventional, except for the positioning device 122. Accordingly, the rear derailleur 18 will not be explained and/or illustrated in detail herein, except as related to the positioning device 122 of the present invention. Moreover, the positioning device 122 is identical to the positioning device 22 of the front derailleur 12, except the positioning device 122 utilizes a modified engagement member 143 in place of the engagement member 43 of the positioning device 22. Accordingly, the positioning device 122 will not be discussed and/or illustrated in detail herein. However, it will be apparent to those skilled in the art from this disclosure that the descriptions and illustrations of the positioning device 22 also apply to the positioning device 122, except as explained and/or illustrated herein. Furthermore, it will be apparent to those skilled in the art from this disclosure that parts of the positioning device 122 that are identical to the positioning mechanism 22 can be identified with identical reference numerals for the sake of convenience.

The engagement member 143 is identical to the engagement member 43 of the front derailleur 12, except for the number of operating (shift) positions has been increased to accommodate the increased number of rear sprockets RS. Thus, the engagement member 143 has more notches 143a than the engagement member 43. In any case, the rear derailleur chain guide 128 is operatively coupled to the positioning device 122 such that when parts of the positioning device 122 are moved between the various operating positions in a manner similar to the first embodiment, the linkage part 48 of the positioning device 122 will move the links 124 about their pivot axes on the base member 120 to move the chain guide 128 between an extended position and a retracted position. Movement of the chain guide 128 caused by movement of the links 124 is well known in the art, and thus, will not be explained and/or illustrated in further detail herein for the sake of brevity.

Front and Rear Shifters

Figure 53:
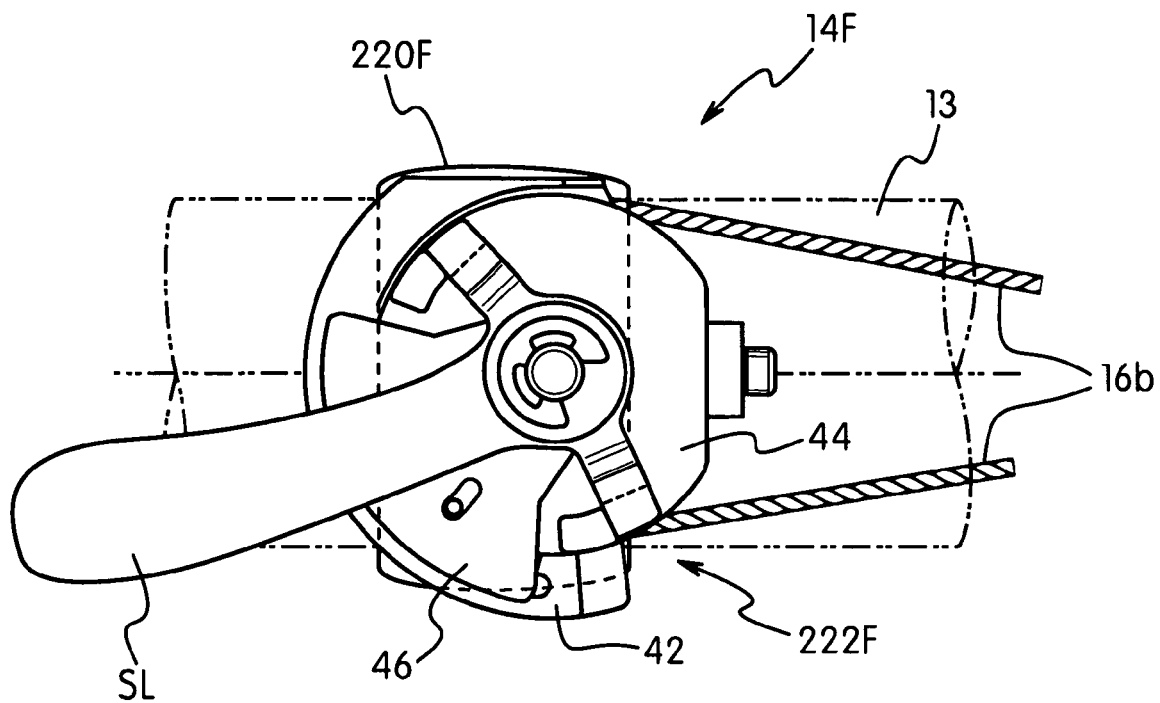
FIG. 53 is an enlarged, top plan view of the rear (left) shifter of the rear shifting system illustrated in FIG. 1.
Figure 54:
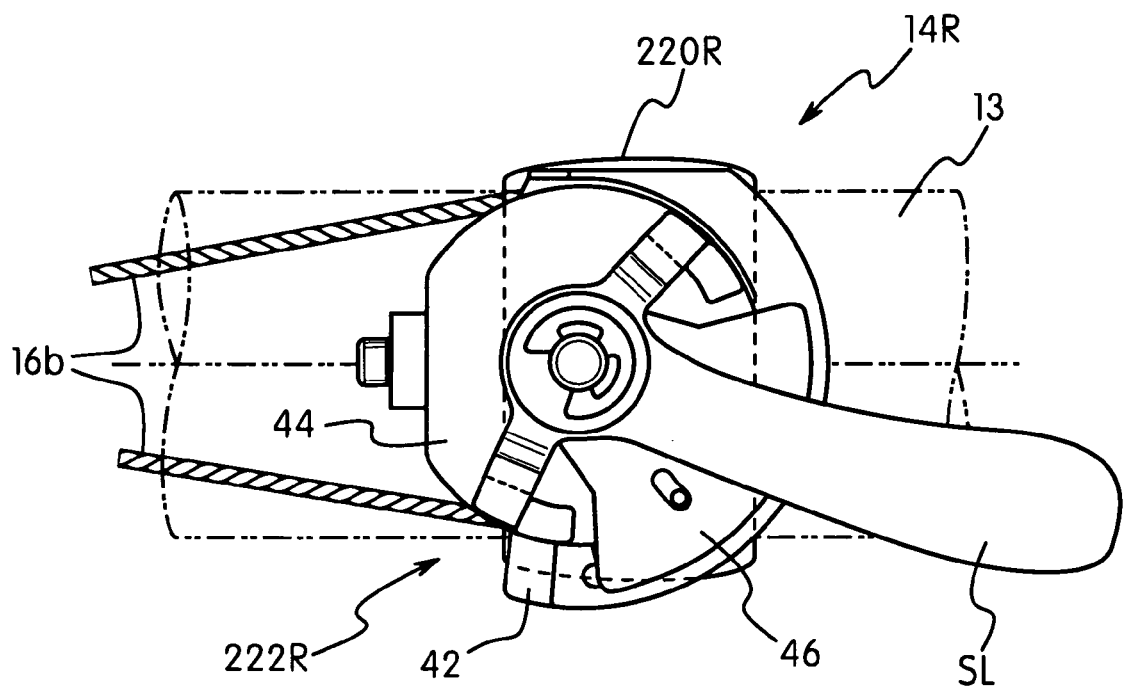
FIG. 54 is an enlarged, top plan view of the front (right) shifter of the rear shifting system illustrated in FIG. 1.

Referring now to FIGS. 53 and 54, the front and rear shifters 14F and 14R of the front and rear shifting systems, respectively, in accordance with the present invention will now be explained in more detail. The front shifter 14F includes a fixing body 220F, a front positioning device 222F, and a shift lever SL. Similarly, The rear shifter 14R includes a fixing body 220R, a rear positioning device 222R, and a shift lever SL. The front and rear shifters 14F and 14R are identical to each other, except that they are mirror images of each other, and utilize the engagement members 43 and 143 in the positioning devices 222F and 222R, respectively. The positioning device 222F is identical to the positioning device 22, except the linkage part 48 of the positioning device 22 has been eliminated and the shift lever SL has been added. Similarly, the positioning device 222R is identical to the positioning device 122, except the linkage part 48 of the positioning device 122 has been eliminated and the shift lever SL has been added. The shift levers SL are arranged to move the wire operating members 44 of the front and rear positioning devices 222F and 222R.

In view of the similarities between the positioning devices 222F and 222R and the positioning devices 22 and 122, respectively, the positioning devices 222F and 222R will not be discussed and/or illustrated in detail herein. However, it will be apparent to those skilled in the art from this disclosure that the descriptions and illustrations of the positioning devices 22 and 122 also apply to the positioning devices 222F and 222R, respectively, except as explained and/or illustrated herein. Furthermore, it will be apparent to those skilled in the art from this disclosure that parts of the positioning devices 222F and 222R that are identical to the positioning devices 22 and 122, respectively, can be identified with identical reference numerals for the sake of convenience. In any event, the shift control levers SL are operatively coupled to the wire operating members 44 in order to move the wire operating members 44 from the operating positions in response to rider actuation of the shift control levers SL.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component positioning device comprising:
a fixed member;
an operating member movably coupled to the fixed member to move between at least two operating positions, the operating member having an input portion, an output portion movable relative to the input portion and a pair of spring elements, with the spring elements being engaged on circumferentially opposite sides of an input part of the input portion and simultaneously engaged with output parts of the output portion such that the spring elements restrict movement of the input portion by the spring elements acting simultaneously against the output parts of the output portion and the input part of the input portion to maintain the input portion in one of the operating positions; and
a positioning mechanism operatively disposed between the operating member and the fixed member, the positioning mechanism including a positioning member that is movable between a first position in which the positioning member is engaged with the fixed member and a second position in which the positioning member is disengaged from the fixed member,
the positioning member being held in engagement with the fixed member in the first position by the input portion while the input portion is in the one of the operating positions, the spring elements normally maintaining the input portion in an intermediate position to hold the positioning member in engagement with a mating structure of the fixed member when the input portion is in each of the operating positions; and
the positioning member being movable from the first position to the second position upon movement of the input portion from the one of the operating positions against a biasing force of one of the spring elements.

2. The bicycle component positioning device according to claim 1, wherein
the positioning member includes at least one projection disposed in a slot of the output portion to control movement of the positioning member between the first position and the second position.

3. A bicycle component positioning device comprising:
a fixed member;
an operating member movably coupled to the fixed member to move between at least two operating positions, the operating member having an input portion and an output portion, with the input portion and the output portion both being pivotally coupled to the fixed member and having a coincident pivot axis, the input portion having an input mounting part pivotally mounted on a pivot structure defining the coincident pivot axis and the output portion having an output mounting part pivotally mounted on the pivot structure, with the input mounting part and the output mounting part being separate parts that are movable relative to each other; and
a positioning mechanism operatively disposed between the operating member and the fixed member, the positioning mechanism including a positioning member that is movable between a first position in which the positioning member is engaged with the fixed member and a second position in which the positioning member is disengaged from the fixed member,
the positioning member being held in engagement with the fixed member in the first position by the input portion when the input portion is in at least one of the operating positions,
the positioning member being movable from the first position to the second position upon movement of the input portion from at least one of the operating positions,
the input portion and the output portion being movably arranged with respect to each other with lost motion such that the input portion moves a prescribed distance before the output portion moves during movement of the operating member between the at least two operating positions,
the positioning member being movably supported by the output portion to move between the first position and the second position, the positioning member having an arc-shaped configuration with a central projection extending therefrom that selectively engages a mating structure of the fixed member,
the positioning member including a pin disposed at each end of the positioning member with each pin being received in a respective slot of the output portion.

4. The bicycle component positioning device according to claim 3, wherein
the operating member is not rotationally biased about the coincident pivot axis relative to the fixed member by a biasing member.

5. The bicycle component positioning device according to claim 3, wherein
the output portion of the operating member includes a first part that is attached to a second part using an adjustment mechanism in order to adjust the relative positions of the first and second parts.

6. The bicycle component positioning device according to claim 3, wherein
the positioning member is normally biased toward the first position by a biasing element disposed between the positioning member and the input portion.

7. The bicycle component positioning device according to claim 3, wherein
one of the input portion and the output portion includes a cable attachment structure configured and arranged to attach at least one control cable thereto.

8. The bicycle component positioning device according to claim 7, wherein
the one of the input portion and the output portion having the cable attachment structure includes a first wire winding groove extending in a first circumferential direction away from the cable attachment structure and a second wire winding groove extending in a second circumferential direction away from the cable attachment structure that is opposite to the first circumferential direction.

9. The bicycle component positioning device according to claim 3, wherein
the positioning member is made of rigid material.

10. The bicycle component positioning device according to claim 3, further comprising
a front derailleur chain guide operatively coupled to the operating member to move between an extended position and a retracted position in response to movement of operating member between the two operating positions.

11. The bicycle component positioning device according to claim 3, further comprising
a rear derailleur chain guide operatively coupled to the operating member to move between an extended position and a retracted position in response to movement of operating member between the two operating positions.

12. The bicycle component positioning device according to claim 3, further comprising
a shift control lever operatively coupled to the operating member in order to move the input portion from the operating position in response to rider actuation of the shift control lever.

13. The bicycle component positioning device according to claim 3, wherein
the positioning member is moved between the first and second positions during both an upshifting operation and a downshifting operation.

14. A bicycle component positioning device comprising:
a fixed member;
an operating member movably coupled to the fixed member to move between at least two operating positions, the operating member having an input portion and an output portion; and
a positioning mechanism operatively disposed between the operating member and the fixed member, the positioning mechanism including a positioning member that is movable between a first position in which the positioning member is engaged with the fixed member and a second position in which the positioning member is disengaged from the fixed member,
the input portion and the output portion being movably arranged with respect to each other with lost motion such that the input portion moves a prescribed distance before the output portion moves during movement of the operating member between the at least two operating positions,
the positioning member
being held in engagement with the fixed member in the first position by the input portion when the input portion is in at least one of the operating positions,
being movable from the first position to the second position upon movement of the input portion from at least one of the operating positions,
being movably supported by the output portion to move between the first position and the second position,
having an arc-shaped configuration with a central projection extending therefrom that selectively engages a mating structure of the fixed member,
including a pin disposed at each end of the positioning member with each pin being received in a respective slot of the output portion, and
pivoting about one of the pins such that the other pin slides in its respective slot when the positioning member moves from the first position to the second position.

* * * * *